(12) United States Patent
Nohara et al.

(10) Patent No.: US 11,876,207 B2
(45) Date of Patent: Jan. 16, 2024

(54) BATTERY AND METHOD OF MANUFACTURING CATHODE OF THE SAME

(71) Applicant: NIPPON TELEGRAPH AND TELEPHONE CORPORATION, Tokyo (JP)

(72) Inventors: Masaya Nohara, Tokyo (JP); Yoko Ono, Tokyo (JP); Mikayo Iwata, Tokyo (JP); Masahiko Hayashi, Tokyo (JP); Takeshi Komatsu, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 647 days.

(21) Appl. No.: 16/312,188

(22) PCT Filed: Jun. 26, 2017

(86) PCT No.: PCT/JP2017/023338
§ 371 (c)(1),
(2) Date: Dec. 20, 2018

(87) PCT Pub. No.: WO2018/003724
PCT Pub. Date: Jan. 4, 2018

(65) Prior Publication Data
US 2019/0237834 A1     Aug. 1, 2019

(30) Foreign Application Priority Data

Jul. 1, 2016   (JP) .................. 2016-131439
Jul. 1, 2016   (JP) .................. 2016-131441
Dec. 16, 2016  (JP) .................. 2016-244113

(51) Int. Cl.
*H01M 12/08*   (2006.01)
*H01M 4/90*    (2006.01)
(Continued)

(52) U.S. Cl.
CPC .......... *H01M 12/08* (2013.01); *C01B 32/182* (2017.08); *H01M 4/86* (2013.01); *H01M 4/90* (2013.01);
(Continued)

(58) Field of Classification Search
CPC ....... H01M 12/08; H01M 4/9016; H01M 4/96
See application file for complete search history.

(56) References Cited

U.S. PATENT DOCUMENTS

2003/0178234 A1   9/2003  Nobuo
2005/0025970 A1*  2/2005  Stipanovic ............ H01G 11/46
                                                428/403

(Continued)

FOREIGN PATENT DOCUMENTS

CA      2421540 A1    9/2003
CN    101811689 A     8/2010
(Continued)

OTHER PUBLICATIONS

Supplementary European Search Report and Search Opinion received for EP Patent Application No. 17820080.4, dated May 25, 2020, 8 pages.

(Continued)

*Primary Examiner* — Ula C Ruddock
*Assistant Examiner* — Frank A Chernow
(74) *Attorney, Agent, or Firm* — WOMBLE BOND DICKINSON (US) LLP

(57) ABSTRACT

A battery includes a cathode (101), an anode (102), and an electrolyte (103). The cathode (101) is made of a bicontinuous body having a three-dimensional network structure including a plurality of nanostructures. The electrolyte (103) is sandwiched between the cathode (101) and the anode (102) and made of a salt. The electrolyte (103) may be made of, e.g., an aqueous solution of one of potassium chloride (Continued)

and sodium chloride, or a mixture thereof. The anode (102) may contain, e.g., a metal selected from magnesium, zin, iron, and aluminum.

12 Claims, 8 Drawing Sheets

(51) Int. Cl.
*H01M 4/96* (2006.01)
*H01M 4/86* (2006.01)
*H01M 12/06* (2006.01)
*C01B 32/182* (2017.01)

(52) U.S. Cl.
CPC .......... *H01M 4/9016* (2013.01); *H01M 4/96* (2013.01); *H01M 12/06* (2013.01)

(56) References Cited

U.S. PATENT DOCUMENTS

| | | | |
|---|---|---|---|
| 2008/0032177 | A1 | 2/2008 | Yodoshi |
| 2011/0189590 | A1* | 8/2011 | Guo .................. H01M 4/9016 429/535 |
| 2011/0229777 | A1 | 9/2011 | Mak et al. |
| 2012/0308902 | A1 | 12/2012 | Mizuno et al. |
| 2014/0322608 | A1* | 10/2014 | Claussen ................. C01B 32/15 429/224 |
| 2015/0118582 | A1* | 4/2015 | Badding ............. H01M 4/9041 429/522 |

FOREIGN PATENT DOCUMENTS

| | | |
|---|---|---|
| CN | 101941693 A | 1/2011 |
| CN | 102210042 A | 10/2011 |
| CN | 102656741 A | 9/2012 |
| CN | 103337639 A | 10/2013 |
| CN | 104201397 A | 12/2014 |
| CN | 104733700 A | 6/2015 |
| CN | 105449226 A | 3/2016 |
| JP | 11-074122 A | 3/1999 |
| JP | 2001-155694 A | 6/2001 |
| JP | 2003-272673 A | 9/2003 |
| JP | 2006-001751 A | 1/2006 |
| JP | 2007-055865 A | 3/2007 |
| JP | 2012-502427 A | 1/2012 |
| JP | 2013-149530 A | 8/2013 |
| JP | 2013-220966 A | 10/2013 |
| JP | 5646104 B1 | 12/2014 |
| JP | 2015-026482 A | 2/2015 |
| JP | 2015-046312 A | 3/2015 |
| JP | 2015-046368 A | 3/2015 |
| JP | 2015-195194 A | 11/2015 |
| JP | 2016-004693 A | 1/2016 |
| WO | 2010/027337 A1 | 3/2010 |
| WO | 2011/074122 A1 | 6/2011 |
| WO | 2015/109272 A1 | 7/2015 |
| WO | 2015/146915 A1 | 10/2015 |
| WO | 2015/194066 A1 | 12/2015 |

OTHER PUBLICATIONS

Office Action received for Japanese Patent Application No. 2018-525147, dated May 7, 2019, 10 pages (5 pages of English Translation and 5 pages of Office Action).
Office Action received for Japanese Patent Application No. 2018-525147, dated Nov. 26, 2019, 8 pages (4 pages of English Translation and 4 pages of Office Action).
Yuasa et al., "Discharge properties of Mg—Al—Mn—Ca and Mg—Al—Mn alloys as anode materials for primary magnesium-air batteries", Journal of Power Sources, vol. 297, 2015, pp. 449-456.
Xue et al., "Template-directed fabrication of porous gas diffusion layer for magnesium air batteries", Journal of Power Sources, vol. 297, 2015, pp. 202-207.
Wang et al., "Discharge behaviour of Mg—Al—Pb and Mg—Al—Pb—In alloys as anodes for Mg-air battery", Electrochimica Acta, vol. 149, 2014, pp. 193-205.
Liu et al., "High-performance non-spinel cobalt-manganese mixed oxide-based bifunctional electrocatalysts for rechargeable zinc-air batteries", Nano Energy, vol. 20, 2016, pp. 315-325.
International Search Report and Written Opinion received for PCT Patent Application No. PCT/JP2017/023338, dated Aug. 1, 2017, 17 pages (9 pages of English Translation and 8 pages of Original Document).
International Preliminary Report on Patentability received for PCT Patent Application No. PCT/JP2017/023338, dated Jan. 10, 2019, 15 pages (9 pages of English Translation and 6 pages of Original Document).
Ganesan et al., "Nitrogen and Sulfur Co-doped Graphene Supported Cobalt Sulfide Nanoparticles as an Efficient Air Cathode for Zinc-air Battery", Electrochimica Acta, vol. 183, 2015, pp. 63-69.
Office Action received for Chinese Patent Application No. 201780041139.2, dated Jan. 13, 2022, 20 pages (11 pages of English Translation and 9 pages of Office Action).
Office Action received for European Patent Application No. 17820080.4, dated Feb. 14, 2022, 5 pages.
Office Action received for Chinese Patent Application No. 201780041139.2, dated Oct. 8, 2022, 16 pages (10 pages of English Translation and 6 pages of Office Action).
Office Action received for European Patent Application No. 17820080.4, dated Aug. 26, 2021, 6 pages.
Office Action received for European Patent Application No. 17820080.4, dated Feb. 22, 2021, 6 pages.

* cited by examiner

BATTERY AND METHOD OF MANUFACTURING CATHODE OF THE SAME

TECHNICAL FIELD

The present invention relates to a battery using a metal such as magnesium or zinc as an anode, and a method of manufacturing a cathode of the same.

BACKGROUND ART

Conventionally, alkali batteries and Zinc-carbon batteries have widely been used as disposal primary batteries. Also, as IoT (Internet of Things) develops in recent years, the development of scattering sensors to be installed in all places of the natural world such as soil and woods is advancing. Accordingly, small-sized high-performance lithium-ion batteries corresponding to various applications such as these sensors in addition to the conventional mobile devices are widespread.

Unfortunately, the presently generally used disposal batteries are made of rare metals such as lithium, nickel, manganese, and cobalt, and hence have the problem of the depletion of resources. Also, strong alkali such as an aqueous sodium hydroxide solution or an organic electrolyte is used as an electrolyte, and this makes final disposal difficult. Furthermore, the batteries may influence the peripheral environment depending on the use environment such as a case in which they are used as driving sources of sensors to be buried in soil.

An air battery and water battery are examples of batteries presently researched and developed as next-generation batteries, in order to solve the problems as described above. Oxygen in the air to be used as a cathode active material is externally supplied to the air battery. Also, the water battery uses water as a cathode active material.

In the air battery and water battery, therefore, the battery cell can be filled with a metal anode. Metals such as magnesium, iron, aluminum, and zinc can be used as the anode. Accordingly, when using materials which are plentiful as resources, it is possible to form an air battery or water battery which is low in both cost and environmental load.

For example, air batteries using zinc as anodes are commercially available as driving sources of hearing aids (see non-patent literatures 1, 2, and 3). Also, air batteries using magnesium as anodes are presently researched and developed as low-environmental-load batteries (see non-patent literatures 4 and 5).

RELATED ART LITERATURE

Non-Patent Literature

Non-Patent Literature 1: Xien Liu et al., "High-performance non-spinel cobalt-manganese mixedoxide-based bifunctional electrocatalysts for rechargeablezinc-air batteries", Nano Energy, vol. 20, pp. 315-325, 2016.

Non-Patent Literature 2: P. Ganesan et al., "Nitrogen and Sulfur Co-doped Graphene Supported Cobalt Sulfide Nanoparticles as an Efficient Air Cathode for Zinc-air Battery", Electrochimica Acta, vol. 183, pp. 63-69, 2015.

Non-Patent Literature 3: M. Yuasa et al., "Discharge properties of Mg—Al—Mn—Ca and Mg—Al—Mn alloys as anode materials for primary magnesium-air batteries", Journal of Power Sources, vol. 297, pp. 449-456, 2015.

Non-Patent Literature 4: Y. Xue et al., "Template-directed fabrication of porous gas diffusion layer for magnesium air batteries", Journal of Power Sources, vol. 297, pp. 202-207, 2015.

Non-Patent Literature 5: N. Wang et al., "Discharge behaviour of Mg—Al—Pb and Mg—Al—Pb—In alloys as anodes for Mg-air battery", Electrochimica Acta, vol. 149, pp. 193-205, 2014.

DISCLOSURE OF INVENTION

Problem to be Solved by the Invention

In the above-described techniques, a cobalt-manganese mixed oxide is used as an electrode material. This poses the problem of resource depletion. In addition, potassium hydroxide as strong alkali is used as an electrolyte. This makes disposal of the battery not easy, and also makes handling of the battery not easy, for example, the battery may influence the peripheral environment.

The present invention has been made to solve the problems as described above, and has as its object to facilitate handling a battery using a metal such as magnesium or zinc as an anode.

Means of Solution to the Problem

A battery according to the present invention includes a cathode made of a bicontinuous body having a three-dimensional network structure including a plurality of nanostructures, an anode, and an electrolyte sandwiched between the cathode and the anode and made of a salt.

In the abovementioned battery, each of the plurality of nanostructures may be a nanosheet made of at least one of carbon, iron oxide, manganese oxide, zinc oxide, molybdenum oxide, and molybdenum sulfide, or a nanofiber made of at least one of carbon, iron oxide, manganese oxide, zinc oxide, molybdenum oxide, molybdenum sulfide, and cellulose.

The abovementioned battery may further include a catalyst carried by the cathode, wherein the catalyst may be made of at least one metal selected from iron, manganese, zinc, copper, and molybdenum, or an oxide of at least one metal selected from calcium, iron, manganese, zinc, copper, and molybdenum.

In the abovementioned battery, the catalyst may be made of an aqueous solution of one of potassium chloride and sodium chloride, or an aqueous solution of a mixture of potassium chloride and sodium chloride.

The abovementioned battery further includes a housing configured to accommodate a cell including the cathode, the electrolyte, and the anode, wherein the housing is made of a naturally degradable material.

In the abovementioned battery, the cathode is an air electrode. In the abovementioned battery, an active material in the cathode is water. Also, the anode may contain one of magnesium, zinc, iron, and aluminum.

A method of manufacturing a cathode of a battery according to the present invention is a method of manufacturing a cathode of a battery including the cathode made of a bicontinuous body having a three-dimensional network structure including a plurality of nanostructures, an anode, and an electrolyte sandwiched between the cathode and the anode and made of a salt, including a freezing step of obtaining a frozen body by freezing a sol or gel in which the plurality of nanostructures are dispersed, and a drying step of obtaining the bicontinuous body by drying the frozen body in a vacuum.

The abovementioned method of manufacturing a cathode of a battery may further include a gel producing step of causing bacteria to produce the gel in which nanofibers made of one of iron oxide, manganese oxide, and cellulose are dispersed, wherein in the freezing step, the frozen body may be obtained by freezing the gel produced in the gel producing step.

The abovementioned method of manufacturing a cathode of a battery may further include a carbonizing step of carbonizing the bicontinuous body obtained from the gel by heating in a gas atmosphere in which cellulose is not burned, wherein in the gel producing step, the gel in which the nanofibers made of cellulose are dispersed is produced.

In the abovementioned method of manufacturing a cathode of a battery, the cathode is an air electrode. Also, an active material in the cathode is water.

In the abovementioned method of manufacturing a cathode of a battery, the anode may contain one of magnesium, zinc, iron, and aluminum.

Effect of the Invention

In the present invention as explained above, the cathode is made of the bicontinuous body having the three-dimensional network structure including the plurality of nanostructures, and the electrolyte is made of a salt. This achieves a superior effect of making the battery easier to handle.

BEST MODE FOR CARRYING OUT THE INVENTION

Embodiments of the present invention will be explained below with reference to the accompanying drawings.

First Embodiment

Figure 1:
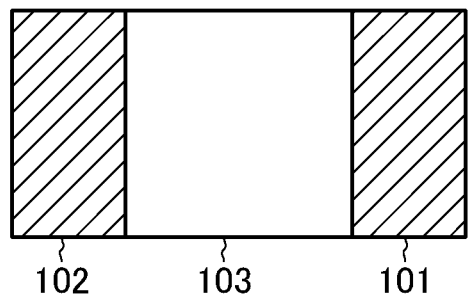
FIG. 1 is a view showing the arrangement of a battery according to the first embodiment of the present invention.

First, a battery according to the first embodiment of the present invention will be explained with reference to FIG. 1. This battery according to the first embodiment includes a cathode 101, an anode 102, and an electrolyte 103. The cathode 101 is made of a bicontinuous body having a three-dimensional network structure including a plurality of nanostructures.

The electrolyte 103 is sandwiched between the cathode 101 and anode 102 and made of a salt. For example, the electrolyte 103 may be made of an aqueous solution of one of potassium chloride and sodium chloride, or an aqueous solution of a mixture of potassium chloride and sodium chloride. Since the electrolyte 103 is made of a salt, the battery is easy to dispose. In addition, there is no influence on the peripheral environment, so the battery is easy to handle.

For example, a plurality of nanostructures are integrated into a three-dimensional network structure by noncovalent bonds, thereby forming a bicontinuous body. This bicontinuous body is a porous body and has an integrated structure. The nanostructure is a nanosheet or nanofiber. The bicontinuous body having the three-dimensional network structure in which the plurality of nanostructures are integrated by noncovalent bonds has a flexible structure in which the bonded portions of the nanostructures are deformable.

Each of the plurality of nanostructures is a nanosheet made of at least one of carbon, iron oxide, manganese oxide, zinc oxide, molybdenum oxide, and molybdenum sulfide. Examples of the molybdenum sulfide compound are molybdenum disulfide and phosphorus-doped molybdenum sulfide. The elements of these materials may be 16 types of essential elements (C, O, H, N, P, K, S, Ca, Mg, Fe, Mn, B, Zn, Cu, Mo, and Cl) indispensable to the growth of plants. The elements of these materials may also be Na, Si, Se, Co, Al, and V useful to the growth of plants.

It is important that the nanosheet has conductivity. The nanosheet is defined as a sheet-like substance having a thickness of 1 nm to 1 μm and having planar longitudinal and lateral lengths which are 100 times or more the thickness. An example of a carbon nanosheet is graphene. The nanosheet may also be a roll-like sheet or wave-like sheet, or curved or bent, i.e., can have any shape.

Each of the plurality of nanostructures is a nanofiber made of at least one of carbon, iron oxide, manganese oxide, zinc oxide, molybdenum oxide, molybdenum sulfide, and cellulose (carbonized cellulose). The elements of these materials may be 16 types of essential elements (C, O, H, N, P, K, S, Ca, Mg, Fe, Mn, B, Zn, Cu, Mo, and Cl) indispensable to the growth of plants. The elements of these materials may also be Na, Si, Se, Co, Al, and V useful to the growth of plants.

It is important that the nanofiber has conductivity as well. The nanofiber is defined as a fibrous substance having a diameter of 1 nm to 1 μm and a length which is 100 times or more the diameter. The nanofiber may also be a hollow fiber or coil-like fiber, i.e., can have any shape. Note that cellulose is given conductivity by carbonization as will be described later.

For example, the bicontinuous body as the cathode 101 can be manufactured by first obtaining a frozen body by freezing a sol or gel in which the nanostructures are dispersed (a freezing step), and drying the frozen body in a vacuum (a drying step). Predetermined bacteria can produce a gel in which nanofibers of iron oxide, manganese oxide, silicon, or cellulose are dispersed (a gel producing step).

It is also possible to obtain the bicontinuous body by causing predetermined bacteria to produce a gel in which cellulose nanofibers are dispersed (a gel producing step), and carbonizing the gel by heating it in an inert gas atmosphere (a carbonizing step).

The bicontinuous body forming the cathode 101 has an average pore size of preferably 0.1 to 50 μm, and more preferably 0.1 to 2 μm. The average pore size is a value obtained by a mercury press-in method.

The cathode 101 does not require any additional material, e.g., a binder such as when using a carbon powder, and this is advantageous in both cost and environmental conservation.

Note that the battery is, e.g., an air battery in which the cathode 101 is an air electrode. Note also that the battery is, e.g., a water battery in which an active material in the cathode 101 is water. The anode 102 may contain a metal selected from magnesium, zinc, iron, and aluminum. The cathode 101 preferably carries a catalyst. This catalyst may be made of at least one metal selected from iron, manganese, zinc, copper, and molybdenum, or an oxide of at least one metal selected from calcium, iron, manganese, zinc, copper, and molybdenum.

In the battery according to the first embodiment as explained above, the cathode is made of the bicontinuous body having the three-dimensional network structure including the plurality of nanostructures, and the electrolyte is made of a salt, so the battery is easily disposable. Also, the battery according to the first embodiment has no influence on the peripheral environment, and is easy to handle.

Second Embodiment

Figure 2A:
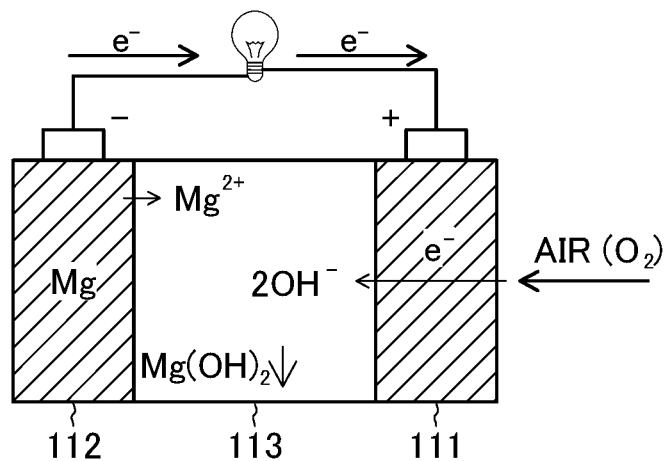
FIG. 2A is a view showing the arrangement of a battery according to the second embodiment of the present invention.
Figure 2B:
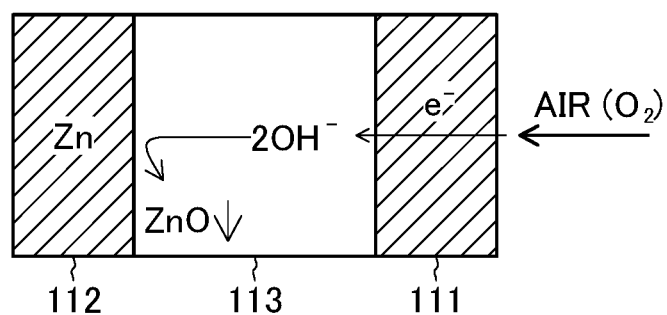
FIG. 2B is a view showing the arrangement of the battery according to the second embodiment of the present invention.

A battery according to the second embodiment of the present invention will be explained below with reference to FIGS. 2A and 2B.

This battery according to the second embodiment is an air battery including a gas diffusion type air electrode (cathode) 111, an anode 112, and an electrolyte 113. The air electrode 111 is made of a bicontinuous body having a three-dimensional network structure including a plurality of nanostructures. The anode 112 contains zinc or magnesium. The anode 112 may also contain iron (Fe) or aluminum (Al).

The electrolyte 113 is sandwiched between the air electrode 111 and anode 112 and made of a salt. For example, the electrolyte 113 may be made of an aqueous solution of one of potassium chloride and sodium chloride, or an aqueous solution of a mixture of potassium chloride and sodium chloride. Since the electrolyte 113 is made of a salt, the battery is easy to dispose. In addition, there is no influence on the peripheral environment, so the battery is easy to handle.

One surface of the air electrode 111 is exposed to the atmosphere, and the other surface thereof is in contact with the electrolyte 113. Also, that surface of the anode 112, which faces the electrolyte 113, is in contact with the electrolyte 113. Note that the electrolyte 113 can be either an electrolytic solution or solid electrolyte. The electrolytic solution is an electrolyte in a liquid form. Also, the solid electrolyte is an electrolyte in a gel form or solid form.

The above-described bicontinuous body is obtained by, e.g., integrating a plurality of nanostructures into a three-dimensional network structure by noncovalent bonds. This bicontinuous body is a porous body and has an integrated structure. The nanostructure is a nanosheet or nanofiber. The bicontinuous body having the three-dimensional network structure in which the plurality of nanostructures are integrated by noncovalent bonds has a flexible structure because the bonded portions of the nanostructures are deformable.

Each of the plurality of nanostructures is a nanosheet made of at least one of carbon, iron oxide, manganese oxide, zinc oxide, molybdenum oxide, and molybdenum sulfide. Examples of the molybdenum sulfide compound are molybdenum disulfide and phosphorus-doped molybdenum sulfide. The elements of these materials may be 16 types of essential elements (C, O, H, N, P, K, S, Ca, Mg, Fe, Mn, B, Zn, Cu, Mo, and Cl) indispensable to the growth of plants. The elements of these materials may also be Na, Si, Se, Co, Al, and V useful to the growth of plants.

It is important that the nanosheet has conductivity. The nanosheet is defined as a sheet-like substance having a thickness of 1 nm to 1 μm and planar longitudinal and lateral lengths which are 100 times or more the thickness. An example of a carbon nanosheet is graphene. The nanosheet may also be a roll-like sheet or wave-like sheet, or curved or bent, i.e., can have any shape.

Each of the plurality of nanostructures is a nanofiber made of at least one of carbon, iron oxide, manganese oxide, zinc oxide, molybdenum oxide, molybdenum sulfide, and cellulose (carbonized cellulose). The elements of these materials may be 16 types of essential elements (C, O, H, N, P, K, S, Ca, Mg, Fe, Mn, B, Zn, Cu, Mo, and Cl) indispensable to the growth of plants. The elements of these materials may also be Na, Si, Se, Co, Al, and V useful to the growth of plants.

It is important that the nanofiber has conductivity as well. The nanofiber is defined as a fibrous substance having a diameter of 1 nm to 1 μm and a length which is 100 times or more the diameter. The nanofiber may also be a hollow fiber or coil-like fiber, i.e., can have any shape. Note that cellulose is given conductivity by carbonization as will be described later.

For example, the bicontinuous body as the air electrode 111 can be manufactured by first obtaining a frozen body by freezing a sol or gel in which the nanostructures are dispersed (a freezing step), and drying the frozen body in a vacuum (a drying step). Predetermined bacteria can produce a gel in which nanofibers of iron oxide, manganese oxide, silicon, or cellulose are dispersed (a gel producing step).

It is also possible to obtain the bicontinuous body by causing predetermined bacteria to produce a gel in which cellulose nanofibers are dispersed (a gel producing step), and carbonizing the gel by heating it in an inert gas atmosphere (a carbonizing step).

The bicontinuous body forming the air electrode 111 has an average pore size of preferably 0.1 to 50 μm, and more preferably 0.1 to 2 μm. The average pore size is a value obtained by a mercury press-in method.

The air electrode 111 does not require any additional material, e.g., a binder such as when using a carbon powder, and this is advantageous in both cost and environmental conservation.

Electrode reactions in the air electrode 111 and the anode 112 containing magnesium will be explained below. In the air electrode reaction, oxygen in the air and the electrolyte come in contact with each other on the surface of the air electrode 111 having conductivity, so a reaction indicated by "$½O_2+H_2O+2e^-→2OH^-$ ... (1)" progresses. On the other hand, in the anode reaction, a reaction "$Mg→Mg^{2+}+2e^-$ ... (2)" progresses in the anode 112 in contact with the electrolyte 113, so magnesium forming the anode 112 releases electrons and dissolves as magnesium ions in the electrolyte 113.

These reactions enable discharge. The overall reaction is "$Mg+½O_2+H_2O+2e^-→Mg(OH)_2$ ... (3)", and this reaction generates (deposits) magnesium hydroxide. The theoretical electromotive force is about 2.7 V. FIG. 2A shows the compounds involved in the above reactions, together with the constituent elements.

Next, electrode reactions in the air electrode 111 and the anode 112 containing zinc will be explained. In the air electrode reaction, oxygen in the air and the electrolyte come in contact with each other on the surface of the air electrode 111 having conductivity, thereby reducing $O_2$ and generating OH by a reaction "$O_2+2H_2O+4e^-→4OH^-$ ... (4)". In the anode reaction, a reaction "$2Zn+4OH^-→2ZnO+2H_2O+4e^-$ ... (5)" progresses in the anode 112 in contact with the electrolyte 113, and zinc oxidizes and deposits as zinc oxide. These reactions enable discharge. The overall reaction is "$2Zn+O_2→2ZnO$", and this is a reaction of generating zinc oxide. The theoretical electromotive force is about 1.65 V. FIG. 2B shows the compounds involved in the above reactions, together with the constituent elements.

Thus, the reactions indicated by formulas (1) and (4) progress on the surface of the air electrode 111 in the air battery, so it is presumably favorable to generate large amounts of these reaction sites inside the air electrode 111.

The air electrode 111 as a cathode can be manufactured by well-known processes such as molding a carbon powder by a binder. As described above, however, it is important to generate large amounts of reaction sites inside the air electrode 111 of the air battery, so the air electrode 111 desirably has a large specific surface area. For example, in the present invention, the specific surface area of the bicontinuous body forming the air electrode 111 is preferably 200 $m^2/g$ or more, and more preferably 300 $m^2/g$ or more.

If the specific surface area of a conventional air electrode manufactured by molding a carbon powder by a binder and pelletizing the molded carbon powder is increased, the binding strength between the carbon powder particles decreases, and the structure deteriorates. This makes stable discharge difficult, and decreases the discharge capacity.

By contrast, the air electrode 111 made of the bicontinuous body having the three-dimensional network structure in which the plurality of nanostructures are integrated by noncovalent bonds as described previously can solve the above-described conventional problem, and increase the discharge capacity.

The air electrode 111 may also carry a catalyst. This catalyst may be made of at least one metal selected from iron, manganese, zinc, copper, and molybdenum, or a metal oxide of at least one metal selected from calcium, iron, manganese, zinc, copper, and molybdenum. Note that the elements of these materials may be made of metals included in 16 types of essential elements indispensable to the growth of plants, and have catalytic activity. The elements of these materials may also be Na, Si, Se, Co, Al, and V useful to the growth of plants. Iron, manganese, and zinc are favorable as metals, and an oxide made of one of these metals or a mixed oxide made of two or more of these metals are preferable. Manganese oxide ($MnO_2$) is particularly suitable. Manganese oxide is suitable because it shows especially high catalytic performance in the present invention.

The metal oxide to be used as a catalyst is also preferably an amorphous hydrate. An example is a hydrate of the above-described transition metal oxide. More specifically, a manganese oxide (IV)-n hydrate is favorable. Note that n is the number of moles of $H_2O$ with respect to 1 mol of $MnO_2$. High battery performance can be obtained by carrying nanosized particles of a manganese oxide hydrate by high dispersion on the surface of the bicontinuous body forming the air electrode 111.

For example, high battery performance can be obtained by using, as the air electrode 111, a structure in which nanosized particles of a manganese oxide hydrate ($MnO_2·nH_2O$) are adhered (added) by high dispersion on the bicontinuous body of the air electrode 111. The content of the catalyst contained in the air electrode 111 is 0.1 to 70 wt %, and preferably, 1 to 30 wt % based on the total weight of the air electrode 111. The battery performance greatly improves when the transition metal oxide is added as a catalyst to the air electrode 111. An electrolytic solution of the electrolyte 113 penetrates into the air electrode 111, and at the same time an oxygen gas in the atmosphere is supplied, thereby forming a triphasic interface of electrolytic solution-electrode-gas (oxygen) as described above. If the catalyst is highly active in this triphasic interface site, oxygen reduction (discharge) on the electrode surface smoothly progresses, and the battery performance greatly improves.

Since a catalyst like this has a strong interaction to oxygen as the cathode active material, the catalyst can adsorb many oxygen species to its surface or absorb oxygen species in oxygen vacancies.

The oxygen species thus adsorbed on the surface of the metal oxide forming the catalyst or absorbed in the oxygen vacancies are used in an oxygen reducing reaction as the oxygen source (an active intermediate reactant) of formula (1) or (4) described above, so the reaction easily progresses. As described above, the metal oxide such as manganese oxide effectively functions as a catalyst. Instead of a metal oxide like this, a metal itself can also be used as a catalyst, and the metal functions like the abovementioned metal oxide.

In the air battery, reaction portions [the abovementioned triphasic portions of the electrolytic solution/electrode/air (oxygen)] which causes the electrode reactions desirably exist as many as possible, in order to increase the efficiency of the battery as described above. From this point of view, it is important that a large amount of above-described triphasic portions exist on the surface of the catalyst, and the catalyst preferably has a large specific surface area. The specific surface area of the catalyst made of a metal or metal oxide may be 0.1 to 1,000 $m^2/g$, and preferably, 1 to 500 $m^2/g$. Note that the specific surface area is obtained by a well-known BET method using $N_2$ adsorption.

The air electrode 111 to which the catalyst is added can be manufactured by a cathode manufacturing method to be described later.

The anode 112 will now be explained. The anode 112 is made of an anode active material. This anode active material is not particularly limited as long as the substance is a material which can be used as an anode material of the air battery, i.e., metal magnesium, a magnesium-containing substance, metal zinc, or a zinc-containing substance.

For example, the anode 112 may be made of, e.g., metal magnesium, a metal magnesium sheet, or a material obtained by bonding a magnesium powder on a metal foil such as a copper foil by pressure. Alternatively, the anode 112 may be made of, e.g., metal zinc, a metal zinc sheet, or a material obtained by bonding a zinc powder on a metal foil such as a copper foil by pressure.

The anode 112 can be formed by well-known methods. For example, when using a magnesium metal as the anode 112, the anode 112 can be manufactured by piling up a plurality of metal magnesium foils and forming the piled foils into a predetermined shape. When using a zinc metal as the anode 112, the anode 112 can be manufactured by forming a zinc plate into a predetermined shape. Note that it is also possible to manufacture the anode 112 by piling up a plurality of metal zinc foils and forming the piled foils into a predetermined shape.

The electrolyte 113 will be explained below. The electrolyte 113 may be a substance through which ions of the metal forming the anode 112 and hydroxide ions can move between the air electrode 111 (a cathode) and the anode 112. An example is a metal salt containing potassium and sodium abundantly existing on the earth. Note that this metal salt may be made of 16 types of essential elements (C, O, H, N, P, K, S, Ca, Mg, Fe, Mn, B, Zn, Cu, Mo, and Cl) indispensable to the growth of plants, or elements contained in seawater or rainwater. The metal salt may also be made of Na, Si, Se, Co, Al, and V useful to the growth of plants.

As described above, the electrolyte 113 may be made of sodium chloride or potassium chloride. Potassium is one of major elements among other fertilizer components. Therefore, potassium chloride is particularly favorable because potassium chloride exerts no influence even if the electrolyte leaks out into soil, and functions as a fertilizer as well.

As another material forming the electrolyte 113, it is also possible to use an aromatic anion-exchange polymer solid electrolyte or inorganic lamellar compound-based solid electrolyte having ion conductivity by which zinc ions and hydroxide ions pass through the electrolyte.

Note that in addition to the abovementioned arrangement, the air battery can include structural members such as a separator, a battery case, and a metal mesh (e.g., a copper mesh), and elements required of the air battery. Conventionally known members and elements can be used as these members and elements. The separator is not particularly limited as long as it is a fibrous material, but a cellulose-based separator made of plant fibers or bacteria is particularly favorable.

Manufacturing methods will be explained below. The battery of the present invention can be manufactured by appropriately arranging the air electrode 111 obtained by a cathode manufacturing method to be described below, the anode 112, and the electrolyte 113, together with other necessary elements based on the structure of a desired air battery, in an appropriate vessel such as a case. Conventionally known methods can be applied as these air battery manufacturing procedures.

The manufacture of the air electrode 111 will be explained below.

[Manufacturing Method 1]

Figure 3:
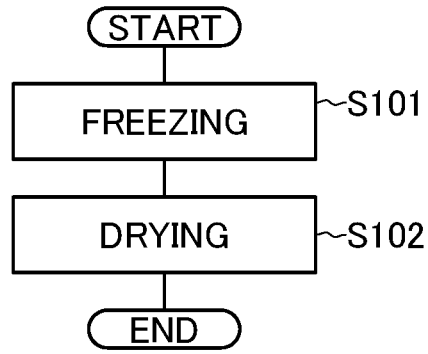
FIG. 3 is a flowchart for explaining manufacturing method 1 according to the second embodiment of the present invention.

First, manufacturing method 1 according to the second embodiment will be explained with reference to FIG. 3. First, in step S101, a frozen body is obtained by freezing a sol or gel in which nanostructures such as nanosheets or nanofibers are dispersed (a freezing step). Then, in step S102, a bicontinuous body is obtained by drying the obtained frozen body in a vacuum (a drying step).

Each step will be explained in more detail below. The freezing step in step S101 is a step of maintaining or constructing a three-dimensional network structure by using a plurality of nanostructures as the material of a flexible bicontinuous body having the three-dimensional network structure including the nanostructures integrated by noncovalent bonds.

The gel means a solid dispersion medium having lost fluidity due to the three-dimensional network structure including the nanostructures as dispersoids. More specifically, the gel means a dispersion system having a shear elastic modulus of $10^2$ to $10^6$ Pa. The dispersion medium of the gel is a water system such as water ($H_2O$), or an organic system such as carboxylic acid, methanol ($CH_3OH$), ethanol ($C_2H_5OH$), propanol ($C_3H_7OH$), n-butanol, isobutanol, n-butylamine, dodecane, unsaturated fatty acid, ethyleneglycol, heptane, hexadecane, isoamylalcohol, octanol, isopropanol, acetone, or glycerin, and it is also possible to mix two or more types thereof.

The sol means a colloid including a dispersion medium and the nanostructures as dispersoids. More specifically, the sol means a dispersion system having a shear elastic modulus of 1 Pa or less. The dispersion medium of the sol is a water system such as water, or an organic system such as carboxylic acid, methanol, ethanol, propanol, n-butanol, isobutanol, n-butylamine, dodecane, unsaturated fatty acid, ethyleneglycol, heptane, hexadecane, isoamylalcohol, octanol, isopropanol, acetone, or glycerin, and it is also possible to mix two or more types thereof.

The freezing step is performed by, e.g., placing the sol or gel in which the nanostructures are dispersed in an appropriate vessel such as a test tube, and freezing the sol or gel placed in the test tube by cooling the surrounding of the test tube by a coolant such as liquid nitrogen. The method of freezing is not particularly limited as long as the dispersion medium of the gel or sol can be cooled to the freezing point or lower, and cooling can also be performed by using a freezer or the like.

By freezing the sol or gel, the dispersion medium loses fluidity, the dispersoids are fixed, and the three-dimensional network structure is constructed. In the freezing step, the specific surface area can freely be adjusted by adjusting the concentration of the sol or gel, and the specific surface area of the obtained bicontinuous body increases as the concentration of the sol or gel decreases. If the concentration becomes 0.01 wt % or less, however, it becomes difficult for the dispersoids to construct the three-dimensional network structure. Therefore, the concentration of the dispersoids is preferably 0.01 to 10 wt % or less.

Since the three-dimensional network structure having a large specific surface area is constructed by using the nanostructures such as nanofibers or nanosheets, this structure has high flexibility when contracted or expanded because pores function as cushions. More specifically, the bicontinuous body desirably has a distortion of 5% or more, and more desirably, 10% or more at the elastic limit.

If the dispersoids are not fixed by freezing, the dispersoids flocculate as the dispersion medium evaporates in the subsequent drying step, so a sufficient specific surface area cannot be obtained. This makes it difficult to manufacture the bicontinuous body having the three-dimensional network structure.

The drying step in step S102 will now be explained. The drying step is a step of extracting, from the frozen body obtained in the freezing step, the dispersoids (the plurality of integrated nanostructures) maintaining or constructing the three-dimensional network structure from the dispersion medium.

In the drying step, the frozen body obtained in the freezing step is dried in a vacuum, thereby sublimating the frozen dispersion medium from the solid state. For example, this step is performed by placing the obtained frozen body in an appropriate vessel such as a flask, and drawing a vacuum in the vessel. Since the frozen body is placed in the vacuum atmosphere, the sublimation point of the dispersion medium decreases, and this makes it possible to sublimate a substance which does not sublimate at atmospheric pressure.

The degree of vacuum in the drying step changes in accordance with a dispersion medium to be used, and is not particularly limited as long as the dispersion medium sublimates. For example, when using water as the dispersion medium, the degree of vacuum must be set such that the pressure is 0.06 MPa or less, but the drying time prolongs because heat is lost as latent heat of sublimation. Therefore, the degree of vacuum is preferably $1.0 \times 10^{-6}$ to $1.0 \times 10^{-2}$ Pa. It is also possible to add heat during drying by using a heater or the like.

In a method of performing drying in the atmosphere, the dispersion medium changes from a solid to a liquid, and the liquid becomes a gas after that. Consequently, the frozen body changes into a liquid state and becomes fluid again in the dispersion medium, so the three-dimensional network structure of the plurality of nanostructures collapses. This makes it difficult to manufacture a flexible bicontinuous body by performing drying in the atmospheric-pressure atmosphere.

[Manufacturing Method 2]

Figure 4:
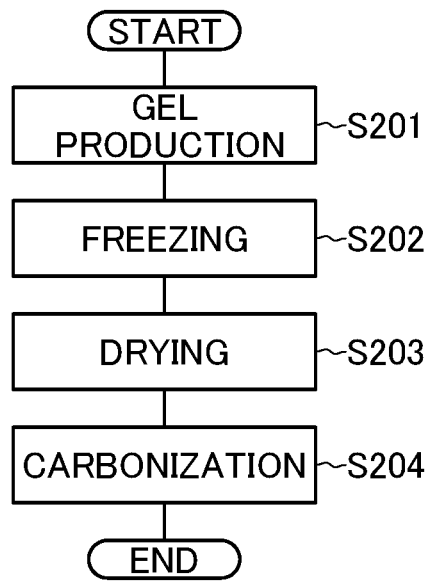
FIG. 4 is a flowchart for explaining manufacturing method 2 according to the second embodiment of the present invention.

Manufacturing method 2 according to the second embodiment will be explained below with reference to FIG. 4.

First, in step S201, a gel in which nanofibers made of iron oxide, manganese oxide, or cellulose are dispersed is produced by using predetermined bacteria (a gel producing step). A bicontinuous body is manufactured by using the gel obtained as described above.

This gel produced by the bacteria has an nm-order fiber as a basic structure, so the bicontinuous body manufactured by using this gel has a large specific surface area. Since the air electrode of the air battery desirably has a large specific surface area as described earlier, the use of the gel produced by the bacteria is favorable. More specifically, the use of the gel produced by bacteria makes it possible to synthetize an air electrode (bicontinuous body) having a specific surface area of 300 m²/g or more.

A bacteria-produced gel has a structure in which fibers get entangled into the form of a coil or mesh, and further has a structure in which nanofibers branch based on the growth of bacteria. Consequently, a manufacturable bicontinuous body has a distortion of 50% or more at the elastic limit, i.e., realizes high flexibility. Therefore, a bicontinuous body manufactured by using the bacteria-produced gel is suitable for the air electrode of the air battery.

As the bacteria-produced gel, it is possible to mix two or more types of bacterial cellulose, iron oxide, and manganese oxide.

Examples of the bacteria are well-known bacteria. Examples are acetobacters such as *Acetobacter xylinum* subspecies *sucrofermentans*, *Acetobacter xylinum* ATCC23768, *Acetobacter xylinum* ATCC23769, *Acetobacter pastorianus* ATCC10245, *Acetobacter xylinum* ATCC14851, *Acetobacter xylinum* ATCC11142, and *Acetobacter xylinum* ATCC10821, *Agrobacterium*, *Rhizobium*, *Sarcina*, *Pseudomonas*, *Achromobacter*, *Alcaligenes*, *Aerobacter*, *Azotobacter*, *Zooglea*, *Enterobacter*, *Kluyvera*, *Leptothrix*, *Gallionella*, *Siderocapsa*, *Thiobacillus*, and bacteria produced by culturing various mutant strains created by mutating the above bacteria by well-known methods using NTG (nitrosoguanidine) and the like.

As a method of obtaining the bicontinuous body by using the above-described bacteria-produced gel, it is possible to obtain a frozen body by freezing the gel in step S202 (a freezing step), and obtain the bicontinuous body by drying the frozen body in a vacuum in step S203 (a drying step), in the same manner as in manufacturing method 1. However, when using a gel in which nanofibers made of bacteria-produced cellulose are dispersed, the obtained bicontinuous body is carbonized by heating in a gas atmosphere in which the cellulose is not burned, in step S204 (a carbonizing step).

The bacterial cellulose as a component contained in the bacteria-produced gel has no conductivity. When using the bacterial cellulose as an air electrode, therefore, the carbonizing step of giving conductivity by carbonizing the bicontinuous body by heating in an inert gas atmosphere is important. The bicontinuous body thus carbonized has high conductivity, a high corrosion resistance, high flexibility, and a large specific surface area, and hence is suitable as the air electrode of the air battery.

The bacterial cellulose can be carbonized by calcination in an inert gas atmosphere at 500° C. to 2,000° C., and more preferably, 900° C. to 1,800° C., after the bicontinuous body having the three-dimensional network structure made of the bacterial cellulose is synthesized in the above-described freezing step and drying step. The gas which does not burn the cellulose can be an inert gas such as nitrogen gas or argon gas. This gas may also be a reducing gas such as hydrogen gas or carbon monoxide gas, or carbon dioxide gas. In the present invention, it is more preferable to use carbon dioxide gas or carbon monoxide gas having an activation effect to a carbon material and expectedly capable of highly activating the bicontinuous body.

[Manufacturing Method 3]

Figure 5:
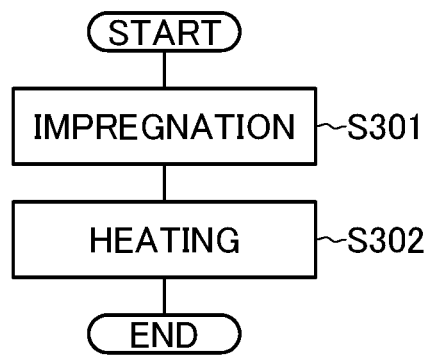
FIG. 5 is a flowchart for explaining manufacturing method 3 according to the second embodiment of the present invention.

Manufacturing method 3 according to the second embodiment will be explained below with reference to FIG. 5. As described previously, the air electrode preferably carries a catalyst. In step S301, the bicontinuous body obtained by manufacturing method 1 or 2 described above is impregnated with an aqueous solution of a metal salt as a precursor of a catalyst (an impregnating step). After the flexible bicontinuous body containing the metal salt is thus prepared, the flexible bicontinuous body containing the metal salt is heated in step S302 (a heating step). Note that a favorable metal of the metal salt to be used is at least one metal selected from the group consisting of iron, manganese, zinc, copper, and molybdenum, and manganese is particularly favorable.

Conventionally known methods can be used to cause the bicontinuous body to carry a transition metal oxide. For example, there is a method of impregnating the bicontinuous body with an aqueous solution of a transition metal chloride or transition metal nitrate and evaporating the bicontinuous body to dryness, and hydrothermally synthesizing the bicontinuous body in water ($H_2O$) at high temperature and high pressure. There is also a sedimentation method of impregnating the bicontinuous body with an aqueous solution of a transition metal chloride or transition metal nitrate, and dropping an aqueous alkaline solution onto the bicontinuous body. Furthermore, there is a sol-gel method of impregnating the bicontinuous body with a transition metal alkoxide solution, and hydrolyzing the bicontinuous body. The conditions of these liquid phase methods are well known, so these well-known conditions are applicable. In the present invention, the liquid phase methods are favorable.

A metal oxide carried by the abovementioned liquid phase methods is in an amorphous state in many cases because crystallization has not progressed. A crystalline metal oxide can be obtained by heating the amorphous precursor in an inert atmosphere at a high temperature of about 500° C. A crystalline metal oxide like this shows high performance even when used as a catalyst of the air electrode.

On the other hand, a precursor powder obtained when drying the abovementioned amorphous precursor at a relatively low temperature of about 100° C. to 200° C. is in a hydrate state while maintaining the amorphous state. This hydrate of the metal oxide can formally be represented by $Me_xO_y \cdot nH_2O$ (where Me means the abovementioned metal, x and y respectively represent the number of metals and the number of oxygens contained in metal oxide molecules, and n is the number of mols of $H_2O$ with respect to 1 mol of the metal oxide). The metal oxide hydrate obtained by low-temperature drying as described above can be used as a catalyst.

The amorphous metal oxide (hydrate) is hardly sintered, and hence has a large surface area and a very small particle size of about 30 nm. Therefore, this amorphous metal oxide is suitable as a catalyst, and high battery performance can be obtained by using this.

As described above, the crystalline metal oxide shows high activity, but the metal oxide crystallized by heating at a high temperature as described above sometimes significantly reduces the surface area, and the particle size sometimes becomes about 100 nm due to flocculation of the particles. Note that this particle size (average particle size) is a value obtained by measuring the diameters of particles in a 10-μm square area (10 μm×10 μm) by observing the particles in an enlarged scale by using a scanning electron microscope (SEM), and calculating the average value.

Also, it is sometimes difficult to add particularly the metal oxide catalyst heated at a high temperature to the surface of the bicontinuous body by high dispersion because the particles flocculate. To obtain a sufficient catalyst effect, it is sometimes necessary to add a large amount of the metal oxide into the air electrode (bicontinuous body), so the manufacture of a catalyst by high-temperature heating is sometimes disadvantageous in cost.

This problem can be solved by using manufacturing method 4, 5, or 6 below.

[Manufacturing Method 4]

Figure 6:
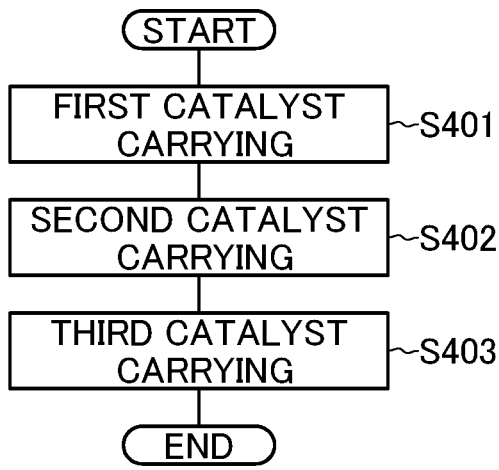
FIG. 6 is a flowchart for explaining manufacturing method 4 according to the second embodiment of the present invention.

Manufacturing method 4 according to the second embodiment will be explained below with reference to FIG. 6.

Manufacturing method 4 causes the bicontinuous body manufactured as explained in manufacturing method 1 or 2 to carry a catalyst. In manufacturing method 4, the following catalyst carrying steps of causing the bicontinuous body to carry a catalyst are added to the manufacture of the bicontinuous body described above.

First, in a first catalyst carrying step of step S401, the bicontinuous body is dipped in an aqueous solution of a surfactant to adhere the surfactant on the surface of the bicontinuous body.

Then, in a second catalyst carrying step of step S402, an aqueous solution of a metal salt is used to adhere the metal salt on the surface of the bicontinuous body by the surfactant adhered on the surface of the bicontinuous body.

Subsequently, in a third catalyst carrying step of step S403, the bicontinuous body on which the metal salt is adhered is heated, thereby causing the bicontinuous body to carry a catalyst made of a metal or metal oxide forming the metal salt.

Note that the abovementioned metal is at least one metal selected from iron, manganese, zinc, copper, and molybdenum, or a metal oxide of at least one metal selected from calcium, iron, manganese, zinc, copper, and molybdenum. Mn or manganese oxide ($MnO_2$) is particularly favorable.

The surfactant used in the first catalyst carrying step of manufacturing method 4 has a function of carrying a metal or transition metal oxide on the air electrode (bicontinuous body) by high dispersion. The surfactant has, in the molecules, a hydrophobic group which is adsorbed to the carbon surface and a hydrophilic group which adsorbs transition metal ions, and hence can adsorb metal ions as the transition metal oxide precursor to the bicontinuous body by a high dispersion degree.

The above-described surfactant is not particularly limited as long as the surfactant has, in its molecules, a hydrophobic group which is adsorbed to the carbon surface and a hydrophilic group which adsorbs manganese ions, but nonionic surfactants are favorable. Examples of an ester-type surfactant are glycerin laurate, glycerin monostearate, sorbitan fatty acid ester, and sucrose fatty acid ester. Examples of an ether-type surfactant are polyoxyethylene alkyl ether, polyoxyethylene alkylphenyl ether, and polyoxyethylene polyoxypropylene glycol.

Examples of an ester ether-type surfactant are polyoxyethylene sorbitan fatty acid ester, polyoxyethylene hexytan fatty acid ester, and sorbitan fatty acid ester polyethylene glycol. Examples of an alkanol amide-type surfactant are diethanol amide laurate, diethanol amide oleate, diethanol amide stearate, and cocamide DEA. Examples of a higher-alcohol surfactant are cetanol, stearyl alcohol, and oleyl alcohol. An example of a poloxamer-type surfactant is poloxamer dimethacrylate.

The concentration of the aqueous surfactant solution in the first catalyst carrying step of manufacturing method 4 is preferably 0.1 to 20 g/L. Also, the dipping conditions such as the dipping time and dipping temperature include dipping the bicontinuous body in a solution at room temperature to 50° C. for 1 to 48 hrs.

The second catalyst carrying step of manufacturing method 4 includes further dissolving a metal salt which functions as a catalyst in the aqueous surfactant-containing solution in the first catalyst carrying step, or adding an aqueous solution of the metal salt to the aqueous surfactant-containing solution. Alternatively, it is also possible to prepare an aqueous solution in which the metal salt functioning as a catalyst is dissolved in addition to the above-described aqueous surfactant-containing solution, and dip the bicontinuous body which is impregnated with the surfactant (to which the surfactant is adhered) in the aqueous metal salt solution.

The bicontinuous body to which the surfactant is adhered may also be impregnated with the aqueous solution in which the metal salt is dissolved. It is also possible to drop an alkaline aqueous solution in the obtained bicontinuous body which contains the metal salt (to which the metal salt is adhered). Consequently, the metal or metal oxide precursor can be adhered to the bicontinuous body.

The addition amount of the metal salt in the second catalyst carrying step of manufacturing method 4 is preferably 0.1 to 100 mmol/L. The dipping conditions such as the dipping time and dipping temperature include dipping the bicontinuous body in a solution at room temperature to 50° C. for 1 to 48 hrs.

More specifically, the method will be explained by taking manganese as an example of the metal. For example, a manganese metal salt (e.g., manganese halide such as manganese chloride or its hydrate) is added to an aqueous solution which contains the surfactant and with which the bicontinuous body is impregnated. Then, an alkaline aqueous solution is dropped on the obtained bicontinuous body containing the manganese metal salt, thereby causing the bicontinuous body to carry manganese hydroxide as a metal or metal oxide precursor.

The catalyst carrying amount by manganese oxide described above can be adjusted by the concentration of the metal salt (e.g., manganese chloride) in the aqueous metal salt solution.

Examples of the alkali to be used in the above-described alkaline aqueous solution are a hydroxide of an alkali metal or alkali earth metal, ammonia water, an aqueous ammonium solution, and an aqueous tetramethylammoniumhydroxide (TMAH) solution. The concentration of these alkaline aqueous solutions is preferably 0.1 to 10 mol/L.

In the third catalyst carrying step of manufacturing method 4, a precursor (metal salt) of the metal or metal oxide adhered on the surface of the bicontinuous body is changed into the metal itself or the metal oxide by heating.

More specifically, the bicontinuous body on which the precursor is adhered is dried at room temperature (about 25° C.) to 150° C., and more preferably, 50° C. to 100° C. for 1 to 24 hrs, and then heated at 100° C. to 600° C., and preferably, 110° C. to 300° C.

In the third catalyst carrying step of manufacturing method 4, an air electrode made of a bicontinuous body on the surface of which a metal itself is adhered as a catalyst can be manufactured by performing heating in an inert atmosphere or reducing atmosphere such as argon, helium, or nitrogen. Also, an air electrode made of a bicontinuous body on the surface of which a metal oxide is adhered as a catalyst can be manufactured by performing heating in an oxygen-containing gas (oxidizing atmosphere).

Furthermore, heating is performed under the above reducing condition, and an air electrode made of a bicontinuous body on which a metal oxide is adhered as a catalyst can be manufactured by forming a bicontinuous body on which a metal itself is adhered as a catalyst, and heating this bicontinuous body in an oxidizing atmosphere.

As another method, it is also possible to dry a bicontinuous body on which a precursor (metal salt) of a metal or metal oxide is adhered at room temperature to 150° C., and more preferably, 50° C. to 100° C., thereby adhering the metal itself on the bicontinuous body, and manufacturing a composite body of the metal/bicontinuous body.

In manufacturing method 4, the adhesion amount (content) of the catalyst made of the metal or metal oxide is 0.1 to 70 wt %, and preferably, 1 to 30 wt % based on the total weight of the bicontinuous body and catalyst.

Manufacturing method 4 can manufacture an air electrode in which the catalyst made of the metal or metal oxide is highly dispersed on the surface of the bicontinuous body, and can configure an air battery having excellent electrical characteristics.

[Manufacturing Method 5]

Manufacturing method 5 according to the second embodiment will be explained below. In manufacturing method 5, the bicontinuous body manufactured as explained in manufacturing method 1 or 2 is caused to carry a catalyst by a method different from manufacturing method 4 described above. In manufacturing method 5, the following catalyst carrying steps of causing the bicontinuous body to carry a catalyst are added to the manufacture of the bicontinuous body described above.

In a first catalyst carrying step, a metal salt is adhered on the surface of the bicontinuous body by dipping the bicontinuous body in an aqueous solution of the metal salt.

Then, in a second catalyst carrying step, the bicontinuous body is caused to carry a catalyst made of a metal forming the metal salt by heating the bicontinuous body on which the metal salt is adhered.

Subsequently, in a third catalyst carrying step, the catalyst is changed into a metal oxide hydrate by causing the bicontinuous body carrying the catalyst to act on high-temperature, high-pressure water.

Note that the abovementioned metal is at least one metal selected from iron, manganese, zinc, copper, and molybdenum, or a metal oxide made of at least one metal selected from calcium, iron, manganese, zinc, copper, and molybdenum. Mn or manganese oxide ($MnO_2$) is particularly favorable.

In the first catalyst carrying step of manufacturing method 5, an aqueous solution of a metal salt as a precursor of a metal or metal oxide to be finally used as a catalyst is adhered (carried) on the surface of the bicontinuous body. For example, it is only necessary to prepare an aqueous solution in which the metal salt is dissolved, and impregnate the bicontinuous body with this aqueous solution. The impregnation conditions and the like are the same as the conventional conditions as described previously.

The second catalyst carrying step of manufacturing method 5 is the same as the third catalyst carrying step of manufacturing method 4, and heating may be performed in an inert atmosphere or reducing atmosphere. As explained as another method of the third catalyst carrying step of manufacturing method 4, the bicontinuous body on which the precursor is adhered may also be heated (dried) at a low temperature (room temperature to 150° C., and more preferably, 50° C. to 100° C.), thereby adhering the metal on the bicontinuous body.

The air electrode 111 using a metal itself as a catalyst shows high activity, but is weak against corrosion and sometimes lacking long-term stability because the catalyst is a metal. By contrast, long-term stability can be realized by changing the metal into a hydrate of a metal oxide by heating in the third catalyst carrying step of manufacturing method 5 to be described in detail below.

In the third catalyst carrying step of manufacturing method 5, the hydrate of the metal oxide is adhered on the bicontinuous body. More specifically, the metal-adhered bicontinuous body obtained in the second catalyst carrying step of manufacturing method 5 is dipped in high-temperature, high-pressure water, thereby changing the adhered metal into a catalyst made of the metal oxide hydrate.

For example, the metal-adhered bicontinuous body may be dipped in water at 100° C. to 250° C., and more preferably, 150° C. to 200° C., thereby oxidizing the adhered metal into the metal oxide hydrate.

Since the boiling point of water at atmospheric pressure (0.1 MPa) is 100° C., nothing can be dipped in water at 100° C. or more at atmospheric pressure. However, when using a predetermined airtight container and raising the internal pressure of this airtight container to, e.g., 10 to 50 MPa, and preferably, about 25 MPa, the boiling point of water rises in the airtight container, and liquid water at 100° C. to 250° C. can be obtained. The metal can be changed into the metal oxide hydrate by dipping the metal-adhered bicontinuous body in the high-temperature water thus obtained.

[Manufacturing Method 6]

Manufacturing method 6 according to the second embodiment will be explained below. In manufacturing method 6, the bicontinuous body manufactured as explained in manufacturing method 1 or 2 is caused to carry a catalyst by a method different from manufacturing methods 4 and 5 described above. In manufacturing method 6, the following catalyst carrying steps of causing the bicontinuous body to carry a catalyst are added to the manufacture of the bicontinuous body described above.

In a first catalyst carrying step, a metal salt is adhered on the surface of the bicontinuous body by dipping the bicontinuous body in an aqueous solution of the metal salt.

Then, in a second catalyst carrying step, the bicontinuous body is caused to carry a catalyst made of a hydrate of a metal oxide of a metal forming the metal salt by causing the bicontinuous body on which the metal salt is adhered to act on high-temperature, high-pressure water.

Note that the abovementioned metal may be at least one of iron, manganese, zinc, copper, and molybdenum.

The first catalyst carrying step of manufacturing method 6 is the same as the first catalyst carrying step of manufacturing method 5, so an explanation thereof will be omitted.

In the second catalyst carrying step of manufacturing method 6, a precursor (the metal salt) adhered on the surface of the bicontinuous body is changed into the hydrate of the metal oxide by heating at a relatively low temperature.

More specifically, the bicontinuous body on which the precursor is adhered is caused to act on the high-temperature, high-pressure water, and dried at a relatively low temperature of about 100° C. to 200° C. Consequently, the precursor changes into a hydrate in which water molecules exist in particles, while maintaining the amorphous state of the precursor. This metal oxide hydrate obtained by low-temperature drying like this is used as a catalyst.

In an air electrode manufactured by manufacturing method 6, the metal oxide hydrate can be carried in the state of nanosized particles on the bicontinuous body by high dispersion. When using the bicontinuous body like this as an air electrode, therefore, the battery can exhibit high battery performance.

The bicontinuous body obtained by each manufacturing method described above can be used as an air electrode by being molded into a predetermined shape by well-known procedures. For example, a bicontinuous body not carrying a catalyst and a bicontinuous body carrying a catalyst are processed into the form of a plate or sheet, and the obtained bicontinuous body is cut into a circular shape having a desired diameter (e.g., 23 mm) by using a punching blade, laser cutter, or the like, thereby obtaining an air electrode.

The present invention will be explained in more detail below by using experiment examples. First, the configuration of an actually used battery will be explained with reference to FIGS. 7A and 7B.

Batteries using the air electrode 111, anode 112, and electrolyte 113 according to the above-described embodiment can be manufactured by conventional shapes such as a coin shape, cylindrical shape, and laminate shape. Conventional methods can be used as methods of manufacturing these batteries.

Figure 7A:
FIG. 7A is a sectional view showing a detailed configuration example of a coin-cell battery according to the second embodiment of the present invention.
Figure 7B:
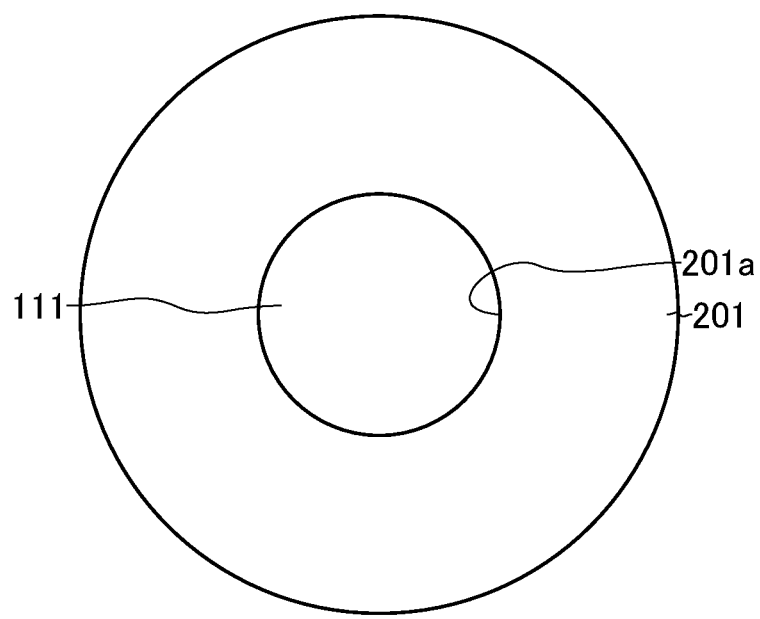
FIG. 7B is a plan view showing a configuration example of the coin-cell battery according to the second embodiment of the present invention.

As shown in FIGS. 7A and 7B, a coin-cell battery includes the air electrode 111, the anode 112, and the electrolyte 113 between them. The electrolyte 113 in this battery is a sheet-like separator impregnated with an electrolytic solution. An air electrode case 201 is arranged on the side of the air electrode 111, and an anode case 202 is arranged on the side of the anode 112. The air electrode 201 has an opening 201a, so the ambient air can come in contact with the air electrode 111.

Also, the air electrode case 201 and anode case 202 are fitted with each other, and a gasket 203 is placed in the fitted portion. A battery cell is obtained by sandwiching the electrolyte 113 between the air electrode 111 and anode 112 and arranged between the air electrode case 201 and anode case 202, and the air electrode case 201 and anode case 202 are integrated by fitting.

Figure 8:
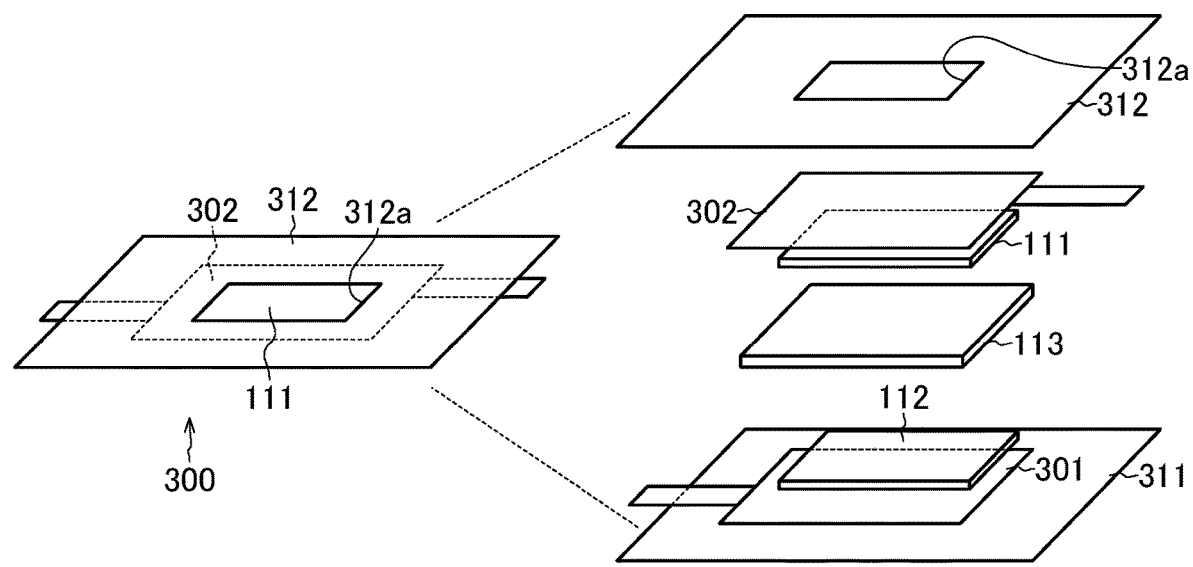
FIG. 8 is a view showing the arrangement of another battery according to the second embodiment of the present invention.

As shown in FIG. 8, it is also possible to accommodate the battery cell in a housing 300 which airtightly closes the interior of the battery cell except the air electrode 111. The housing 300 includes a first housing 311 arranged on the side of the anode 112, and a second housing 312 arranged on the side of the air electrode 111. An opening 312a is formed in the second housing 312, so the ambient air can come in contact with the air electrode 111. Also, an anode current collector 301 is formed between the first housing 311 and anode 112, a cathode current collector 302 is formed between the second housing 312 and air electrode 111, and terminals are extracted outside the housing 300 from these current collectors. Note that when using a metal as the anode 112, the terminal can also be extracted outside directly from the anode 112 without using the anode current collector 301.

In this air battery having the above-described configuration, the electrolyte 113 is preferably formed by a sheet of a water-absorbing insulator such as a coffee filter, kitchen paper, or filter paper. As the electrolyte 113, it is particularly favorable to use a sheet of a naturally degradable material such as a cellulose-based separator made of plant fibers.

Also, the housing 300 is preferably made of a naturally degradable material capable of holding the battery cell inside. The housing 300 can be made of any of a natural substance-based material, bacteria-based material, and chemosynthesis-based material. For example, the housing 300 can be made of polylactic acid, polycaprolactone, polyhydroxyalkanoate, polyglycolic acid, modified polyvinyl alcohol, casein, or modified starch. A chemosynthesis-based material such as plant-derived polylactic acid is particularly favorable. In addition, the shape of the housing 300 is not limited as long as the shape can be obtained by processing biodegradable plastic. An example of a material applicable to the housing 300 is a commercially available biodegradable plastic film. It is also possible to use paper on which a coating film made of a resin such as polyethylene is formed and which is used as a milk pack and the like, and an agar film.

It is possible to airtightly close the interior of the battery cell except the air electrode 111 by bonding the peripheries of the first and second housings 311 and 312 made of the above-described material. The bonding method is not particularly limited, and examples are heat seal and the use of an adhesive. An adhesive made of a biodegradable resin is preferably used. Note that the shape of the air electrode 111, anode 112, electrolyte 113, first housing 311, second housing 312, anode current collector 301, and cathode current collector 302 is not limited as long as the layout of these members for operating as a battery is not impaired. For example, these members can be used as a square or circular sheet shape or a rolled shape in a planar view.

The air battery using the housing 300 made of the above-described naturally degradable material is naturally degraded with time when used in a disposable device such as a soil water sensor, and hence need not be collected. Also, the battery is made of a nature-derived material or fertilizer component, so the load on the environment is extremely low. It is unnecessary to collect the battery when it is used not only in soil but also in natural worlds such as woods and seas. When used in an ordinary living environment, the battery can be disposed as burnable waste.

Experiment Example 1

First, Experiment Example 1 of the second embodiment will be explained. Experiment Example 1 is an example in which a bicontinuous body having a three-dimensional network structure made of a plurality of nanosheets integrated by noncovalent bonds is used as an air electrode. The air electrode was synthesized as follows. In the following explanation, a manufacturing method using graphene as nanosheets will be described as a typical example. However, the bicontinuous body having the three-dimensional network structure can be adjusted by changing the material of the nanosheets from graphene to another material. Note that the porosity to be described below was calculated by modeling a pore into a cylindrical shape, from a pore size distribution obtained by performing a mercury press-in method on the bicontinuous body.

First, a commercially available graphene sol [a dispersion medium: water ($H_2O$), 0.4 wt %, manufactured by Sigma-Aldrich] was placed in a test tube, and completely frozen by dipping the test tube in liquid nitrogen for 30 min. After the graphene sol was completely frozen, the frozen graphene sol was taken out into an eggplant flask and dried in a vacuum of 10 Pa or less by using a freeze-drying machine (manufactured by TOKYO RIKAKIKAI), thereby obtaining a flexible bicontinuous body having a three-dimensional network structure including the graphene nanosheets.

The obtained bicontinuous body was evaluated by performing X-ray diffraction (XRD) measurement, scanning electron microscope (SEM) observation, porosity measurement, a tension test, and BET specific surface area measurement. It was confirmed by the XRD measurement that the bicontinuous body manufactured by the present invention was a carbon (C, PDF card No. 01-075-0444) single phase. Note that PDF card No. is the card number of a PDF (Powder Diffraction File) as a database collected by ICDD (International Centre for Diffraction Data), and this similarly applies hereinafter.

It was also confirmed by the SEM observation and mercury press-in method that the obtained bicontinuous body was a bicontinuous body in which the nanosheets (graphene pieces) continued and the average pore size was 1 μm. In addition, the BET specific surface area of the bicontinuous body was measured by the mercury press-in method and found to be 510 $m^2$/g. Also, the porosity of the bicontinuous body was measured by the mercury press-in method and found to be 90% or more. Furthermore, it was confirmed from the result of the tension test that even when a strain of 20% was applied by tensile stress, the obtained bicontinuous body did not exceed the elastic region and restored to the shape before the application of the stress.

The graphene bicontinuous body as described above was punched into a circular shape having a diameter of 14 mm by using a punching blade, laser cutter, or the like, thereby obtaining a gas diffusion type air electrode.

A magnesium anode was adjusted by punching a commercially available metal magnesium plate (thickness: 200 μm, manufactured by Nilaco) into a circular shape having a diameter of 14 mm by using the punching blade, laser cutter, or the like. Also, a zinc anode was adjusted by punching a commercially available metal zinc plate (thickness: 200 μm, manufactured by Nilaco) into a circular shape having a diameter of 14 mm by using the punching blade, laser cutter, or the like.

As an electrolyte, a solution prepared by dissolving potassium chloride (KCl, manufactured by KANTO KAGAKU) in pure water at a concentration of 1 mol/L was used. As a separator, a cellulose-based separator (manufactured by NIPPON KODOSHI) for batteries was used.

The coin-cell air battery explained with reference to FIGS. 7A and 7B was manufactured by using the air electrode, the anode, the electrolytic solution as an electrolyte, and the separator described above. First, the above-mentioned air electrode was installed in an air electrode case in which the periphery of a copper mesh foil (manufactured by MIT Japan) was fixed to the inside by spot-welding. Also, the periphery of the anode made of a metal magnesium plate was fixed to a copper mesh foil (manufactured by MIT Japan) by spot-welding, and the copper mesh foil was fixed to an anode case by spot-welding. Then, the separator was placed on the air electrode installed in the air electrode case, and the electrolytic solution was injected into the separator. Subsequently, the air electrode case was covered with the anode case to which the anode was fixed, and the peripheries of the air electrode case and anode case were caulked by a coin-cell caulking machine, thereby manufacturing a coin-cell air battery including a polypropylene gasket.

Figure 9:
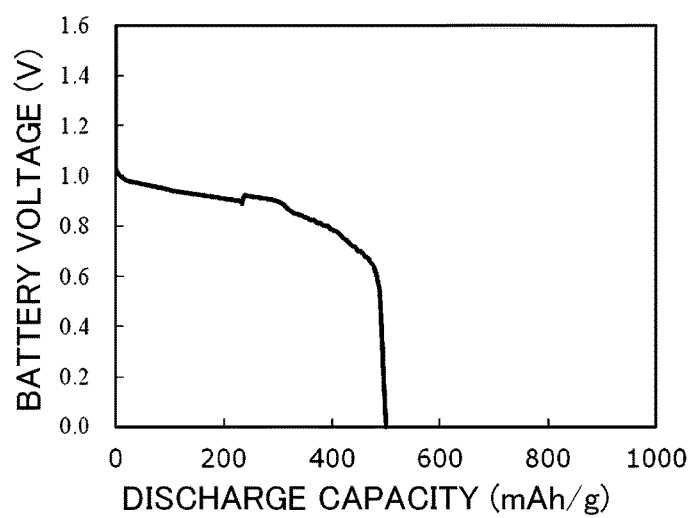
FIG. 9 is a graph showing the initial discharge curve of an air battery using magnesium as an anode according to Experiment Example 1 of the second embodiment of the present invention.

The battery performance of the manufactured coin-cell air battery was measured. First, a discharge test was conducted. This discharge test of the air battery was conducted by using a commercially available charge/discharge measurement system (the SD8 charge/discharge system manufactured by HOKUTO DENKO). An electric current was supplied at a current density of 0.1 mA/$cm^2$ per unit effective area of the air electrode, and measurement was performed until the battery voltage decreased to 0 V from the open circuit voltage. This measurement was performed in a thermostatic tank at 25° C. (the atmosphere was an ordinary living environment). The discharge capacity was represented by the value (mAh/g) per weight of the air electrode made of the bicontinuous body. FIG. 9 shows the initial discharge curve when forming the anode by magnesium in Experiment Example 1 of the second embodiment. Also, FIG. 10 shows the initial discharge curve when forming the anode by zinc in Experiment Example 1 of the second embodiment.

As shown in FIG. 9, when the anode was made of magnesium and the bicontinuous body was used as the air electrode, the average discharge voltage was 1.2 V, and the discharge capacity was 1,110 mAh/g. Note that the average discharge voltage is the battery voltage obtained when the discharge capacity is ½ (in Experiment Example 1, 555 mAh/g) of the discharge capacity (in this experiment example, 1,110 mAh/g) of the battery.

Figure 10:
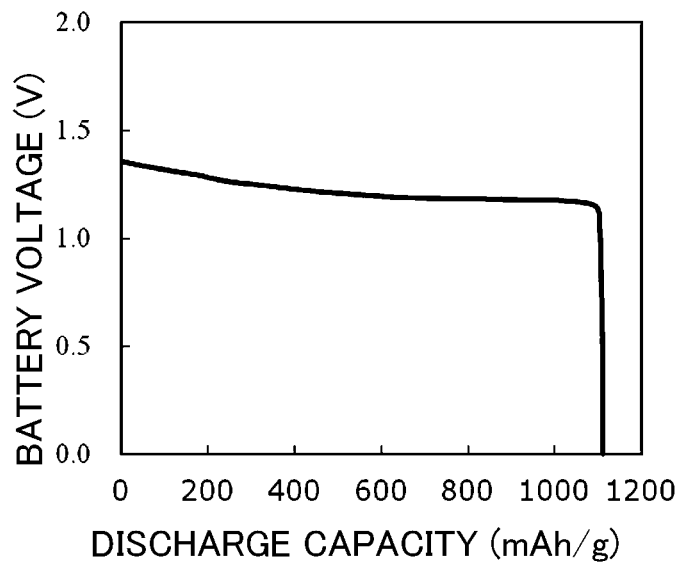
FIG. 10 is a graph showing the initial discharge curve of an air battery using zinc as an anode according to Experiment Example 1 of the second embodiment of the present invention.

Also, as shown in FIG. 10, when the anode was made of zinc and the bicontinuous body was used as the air electrode, the average discharge voltage was 0.9 V, and the discharge capacity was 500 mAh/g. Note that the average discharge voltage is the battery voltage obtained when the discharge capacity is ½ (in Experiment Example 1, 250 mAh/g) of the discharge capacity (in this experiment example, 500 mAh/g) of the battery.

Table 1-1 below shows the discharge capacities of air batteries in which the bicontinuous bodies were manufactured from nanosheets made of carbon (C), iron oxide ($Fe_2O_3$), manganese oxide ($MnO_2$), zinc oxide (ZnO), molybdenum oxide ($MoO_3$), and molybdenum sulfide ($MoS_2$) and used as the air electrodes, and the anodes were made of magnesium.

Also, Table 1-2 below shows the discharge capacities of air batteries in which the bicontinuous bodies were manufactured from nanosheets made of carbon (C), iron oxide ($Fe_2O_3$), manganese oxide ($MnO_2$), zinc oxide (ZnO), molybdenum oxide ($MoO_3$), and molybdenum sulfide ($MoS_2$) and used as the air electrodes, and the anodes were made of zinc.

TABLE 1-1

Experiment Example 1

| Nanosheet material | Discharge capacity (mAh/g) |
|---|---|
| Carbon (C) | 1,110 |
| Iron oxide ($Fe_2O_3$) | 1,160 |
| Manganese oxide ($MnO_2$) | 1,240 |
| Zinc oxide (ZnO) | 1,200 |
| Molybdenum oxide ($MoO_3$) | 1,110 |
| Molybdenum sulfide ($MoS_2$) | 1,220 |

TABLE 1-2

Experiment Example 1

| Nanosheet material | Discharge capacity (mAh/g) |
|---|---|
| Carbon (C) | 500 |
| Iron oxide ($Fe_2O_3$) | 610 |
| Manganese oxide ($MnO_2$) | 690 |
| Zinc oxide (ZnO) | 620 |
| Molybdenum oxide ($MoO_3$) | 500 |
| Molybdenum sulfide ($MoS_2$) | 600 |

As shown in Table 1-1, all initial discharge capacities were 1,000 mAh/g or more, which were values larger than that of Comparative Example 1 (to be described later) in which an air electrode using powdery carbon was evaluated. The nanosheets made of materials other than carbon also had large specific areas like graphene, so the discharge product [$Mg(OH)_2$] efficiently deposited, and this presumably improved the discharge capacity.

Also, as shown in Table 1-2, all initial discharge capacities were 500 mAh/g or more, which were values larger than that of Comparative Example 1 (to be described later) in which an air electrode using powdery carbon was evaluated. The nanosheets made of materials other than carbon also had large specific areas like graphene, so the discharge product (ZnO) efficiently deposited, and this presumably improved the discharge capacity.

Experiment Example 2

Next, Experiment Example 2 of the second embodiment will be explained. Experiment Example 2 is an example in which a bicontinuous body having a three-dimensional network structure made of a plurality of nanofibers integrated by noncovalent bonds is used as an air electrode. The air electrode was synthesized as follows. In the following explanation, a manufacturing method using carbon nanofibers will be described as a typical example. However, the bicontinuous body having the three-dimensional network structure can be adjusted by changing the carbon nanofibers to nanofibers made of another material.

The method of evaluation of the bicontinuous body, the manufacture of an air battery, and the method of a discharge test were performed in the same manner as in Experiment Example 1 of the second embodiment. The bicontinuous body was manufactured by the same process as disclosed in Experiment Example 1 of the second embodiment, and a carbon nanofiber sol [a dispersion medium: water ($H_2O$), 0.4 wt %, manufactured by Sigma-Aldrich] was used as a raw material.

The obtained bicontinuous body was evaluated by performing XRD measurement, SEM observation, porosity measurement, a tension test, and BET specific surface area measurement. It was confirmed by the XRD measurement that the bicontinuous body manufactured by the present invention was a carbon (C, PDF card No. 00-058-1638) single phase. It was also confirmed by the SEM observation and a mercury press-in method that the obtained bicontinuous body was a bicontinuous body in which the nanofibers continued and the average pore size was 1 μm. In addition, the BET specific surface area of the bicontinuous body was measured by the mercury press-in method and found to be 620 $m^2$/g. Also, the porosity of the bicontinuous body was measured by the mercury press-in method and found to be 93% or more. Furthermore, it was confirmed from the result of the tension test that even when a strain of 40% was applied by tensile stress, the bicontinuous body in Experiment Example 2 of the second embodiment did not exceed the elastic region and restored to the shape before the application of the stress.

Coin-cell air batteries similar to those of Experiment Example 1 of the second embodiment were manufactured by using this carbon nanofiber bicontinuous body as an air electrode. Tables 2-1, 2-2, 3-1, and 3-2 show the discharge capacities of the air batteries manufactured in Experiment Example 2 of the second embodiment. Tables 2-1 and 3-1 show the results when the anode was made of magnesium. Tables 2-2 and 3-2 show the results when the anode was made of zinc.

In Experiment Example 2 of the second embodiment, the initial discharge capacity when the anode was made of magnesium was 1,160 mAh/g, which was a value larger than that when using the graphene bicontinuous body in Experiment Example 1 of the second embodiment. Also, the initial discharge capacity when the anode was made of zinc was 580 mAh/g, which was a value larger than that when using the graphene bicontinuous body in Experiment Example 1 of the second embodiment. The characteristics thus improved probably because the use of the bicontinuous body having higher flexibility enabled a smooth reaction during discharge.

Tables 2-1 and 2-2 show the discharge capacities of air batteries in which the bicontinuous bodies were manufactured from nanofibers made of carbon (C), iron oxide ($Fe_2O_3$), manganese oxide ($MnO_2$), zinc oxide (ZnO), molybdenum oxide ($MoO_3$), and molybdenum sulfide ($MoS_2$) and used as the air electrodes.

TABLE 2-1

Experiment Example 2

| Nanofiber material | Discharge capacity (mAh/g) |
|---|---|
| Carbon (C) | 1,160 |
| Iron oxide ($Fe_2O_3$) | 1,000 |
| Manganese oxide ($MnO_2$) | 1,290 |
| Zinc oxide (ZnO) | 1,190 |
| Molybdenum oxide ($MoO_3$) | 1,010 |
| Molybdenum sulfide ($MoS_2$) | 1,090 |

TABLE 2-2

Experiment Example 2

| Nanofiber material | Discharge capacity (mAh/g) |
|---|---|
| Carbon (C) | 580 |
| Iron oxide ($Fe_2O_3$) | 650 |
| Manganese oxide ($MnO_2$) | 710 |
| Zinc oxide (ZnO) | 620 |
| Molybdenum oxide ($MoO_3$) | 570 |
| Molybdenum sulfide ($MoS_2$) | 600 |

In Table 2-1, all initial discharge capacities were 1,000 mAh/g or more, which were values larger as a whole than those of the bicontinuous bodies including the nanosheets in Experiment Example 1 of the second embodiment. Like carbon nanofibers, the flexible air electrode efficiently deposited the discharge product [$Mg(OH)_2$], and this presumably improved the discharge capacity, in these nanofiber examples as well.

Also, in Table 2-2, all initial discharge capacities were 570 mAh/g or more, which were values larger as a whole than those of the bicontinuous bodies including the nanosheets in Experiment Example 1 of the second embodiment. Like carbon nanofibers, the flexible air electrode efficiently deposited the discharge product (ZnO), and this presumably improved the discharge capacity, in these nanofiber examples as well.

Experiment Example 3

Experiment Example 3 of the second embodiment will be explained below. In Experiment Example 3, an air electrode formed by causing a bicontinuous body made of carbon nanofibers to carry an oxide or metal as a catalyst will be explained. A case in which the bicontinuous body is caused to carry $MnO_2$ as a catalyst will be explained below as a typical example. However, it is possible to cause the bicontinuous body to carry an arbitrary oxide as a catalyst by changing Mn to an arbitrary metal. It is also possible to cause the bicontinuous body to carry an arbitrary metal as a catalyst by performing no neutralization step.

The method of evaluation of the bicontinuous body, the manufacture of an air battery, and the method of a charge/discharge test were performed in the same manner as in Experiment Examples 1 and 2 of the second embodiment. The bicontinuous body was manufactured following the same procedures as in Experiment Example 2 of the second embodiment. After that, commercially available manganese (II) chloride tetrahydrate ($MnCl_2.4H_2O$; manufactured by KANTO KAGAKU) was dissolved in distilled water, and the manufactured bicontinuous body was impregnated with the solution, thereby causing the bicontinuous body to carry manganese chloride. Then, neutralization was performed by gradually dropping ammonia water (28%) on the bicontinuous body carrying manganese chloride (or on manganese chloride carried by the bicontinuous body) until the pH became 7.0, thereby depositing manganese hydroxide. The deposit was repeatedly washed with distilled water five times so that no chlorine remained.

The obtained manganese hydroxide-carrying bicontinuous body was heated in an argon atmosphere at 500° C. for 6 hrs, thereby manufacturing a bicontinuous body carrying manganese oxide ($MnO_2$). The manufactured manganese oxide-carrying bicontinuous body was evaluated by performing XRD measurement and TEM observation. It was possible to observe a peak of manganese oxide ($MnO_2$, PDF file No. 00-011-079) by the XRD measurement. It was confirmed that the catalyst carried by the bicontinuous body was a manganese oxide single phase. Also, a state in which manganese oxide deposited in the form of particles having an average particle size of 100 nm on the surface of the bicontinuous body was observed by the TEM.

A coin-cell air battery similar to those in Experiment Examples 1 and 2 of the second embodiment was manufactured by using this manganese oxide-carrying bicontinuous body as an air electrode. The discharge capacity of the manufactured air battery including an anode made of magnesium in Experiment Example 3 of the second embodiment was 1,550 mAh/g. Also, the discharge capacity of the air battery including an anode made of zinc in Experiment Example 3 of the second embodiment was 710 mAh/g. Tables 3-1 and 3-2 below also show the results when using other catalysts.

TABLE 3-1

Experiment Example 3

| Catalyst/bicontinuous body materials | Discharge capacity (mAh/g) |
|---|---|
| $MnO_2$/C | 1,550 |
| $Fe_2O_3$/C | 1,310 |
| ZnO/C | 1,410 |
| $MoO_3$/C | 1,350 |
| $MoS_2$/C | 1,400 |
| Fe/C | 1,440 |
| Mn/C | 1,540 |
| Zn/C | 1,190 |
| Mo/C | 1,200 |

TABLE 3-2

Experiment Example 3

| Catalyst/bicontinuous body materials | Discharge capacity (mAh/g) |
|---|---|
| $MnO_2$/C | 710 |
| $Fe_2O_3$/C | 690 |
| ZnO/C | 800 |
| $MoO_3$/C | 690 |
| $MoS_2$/C | 650 |
| Fe/C | 630 |
| Mn/C | 710 |
| Zn/C | 620 |
| Mo/C | 690 |

Experiment Example 4

Experiment Example 4 of the second embodiment will be explained below. In Experiment Example 4, a case in which a bicontinuous body made of a gel in which nanofibers produced by bacteria are dispersed carries manganese oxide as a catalyst will be explained. In the following explanation, a case in which a bicontinuous body is manufactured from nanofibers made of iron oxide produced by iron bacteria will be described as a typical example. However, a bicontinuous body including nanofibers made of manganese oxide can be adjusted by changing iron bacteria to arbitrary bacteria.

The method of evaluation of the bicontinuous body, the method of manufacture of an air battery, and the method of a discharge test were performed in the same manner as in Experiment Examples 1 and 2 of the second embodiment.

First, *Leptothrix ochracea* as iron bacteria was placed together with iron pieces (purity: 99.9% or more, manufactured by KOJUNDO CHEMICAL LABORATORY) in a JOP liquid culture medium in a test tube, and cultured by a shaker at 20° C. for 14 days. The JOP liquid culture medium is a culture medium which contains, in 1 L of sterilized ground water, 0.076 g of disodium hydrogen phosphate dodecahydrate, 0.02 g of potassium dihydrogen phosphate dihydrate, 2.383 g of HEPES [4-(2-hydroxyethyl)-1-piperazineethanesulfonic acid: a substance for a buffer solution], and 0.01 mmol/L of iron sulfate, and in which the pH is adjusted to 7.0 with an aqueous sodium hydroxide solution. Also, *Leptothrix ochracea* was purchased from ATCC (American Type Culture Collection).

After the culture, the iron pieces were removed, and the obtained gel was washed in pure water for 24 hrs by using a shaker. In this washing, pure water was changed three times. The washed gel was used as a raw material, and an air battery was manufactured by the same processes as disclosed in Experiment Examples 1 and 3 of the second embodiment.

The obtained bicontinuous body was evaluated by performing XRD measurement, SEM observation, porosity measurement, a tension test, and BET specific surface area measurement. It was confirmed by the XRD measurement that the bicontinuous body manufactured by the present invention was made of amorphous $Fe_3O_4$ and $\gamma$-$Fe_2O_3$ ($Fe_3O_4$, PDF card No. 01-075-1372, and $\gamma$-$Fe_2O_3$, PDF card No. 00-039-1346).

Also, it was confirmed by the SEM observation that hollow nanofibers (nanotubes) having a diameter of 1 μm continued in the bicontinuous body. In addition, the BET specific surface area was measured by a mercury press-in method and found to be 800 $m^2$/g. When the porosity of the bicontinuous body was measured by the mercury press-in method, the porosity was 95% or more. Furthermore, it was confirmed by the result of the tension test that even when a strain of 60% was applied by tensile stress, the bicontinuous body did not exceed the elastic region, and restored to the shape before the application of the stress.

In Experiment Example 4 of the second embodiment, the discharge capacity of an air battery (the anode was magnesium) using the bicontinuous body made of the iron bacteria-produced iron oxide nanofibers as an air electrode was 1,770 mAh/g. Also, in Experiment Example 4 of the second embodiment, the discharge capacity of an air battery (the anode was zinc) using the bicontinuous body made of the iron bacteria-produced iron oxide nanofibers as an air electrode was 720 mAh/g. Tables 4-1 and 4-2 below also show the results obtained when using another bicontinuous body. Table 4-1 shows the result of an air battery in which the anode was made of magnesium. Table 4-2 shows the result of an air battery in which the anode was made of zinc.

TABLE 4-1

Experiment Example 4

| Catalyst/bicontinuous body materials | Discharge capacity (mAh/g) |
|---|---|
| $MnO_2$/bacteria-produced iron oxide | 1,770 |
| $MnO_2$/bacteria-produced $MnO_2$ | 1,610 |

TABLE 4-2

Experiment Example 4

| Catalyst/bicontinuous body materials | Discharge capacity (mAh/g) |
|---|---|
| $MnO_2$/bacteria-produced iron oxide | 720 |
| $MnO_2$/bacteria-produced $MnO_2$ | 810 |

In Experiment Example 4 of the second embodiment, the initial discharge capacity when the anode was made of magnesium was 1,770 mAh/g, which was a value larger to some extent than that when using the carbon nanofiber bicontinuous body carrying manganese oxide as in Experiment Example 3 of the second embodiment. Also, the initial discharge capacity when the anode was made of zinc was 720 mAh/g, which was a value larger to some extent than that when using the carbon nanofiber bicontinuous body carrying manganese oxide as in Experiment Example 3 of the second embodiment. These results were obtained perhaps because the use of the bicontinuous body having higher flexibility enabled a smooth reaction during discharge.

Also, as shown in Table 4-1, the initial discharge capacity of an air battery (the anode was magnesium) including an air electrode using the bicontinuous body made of bacteria-produced manganese oxide and containing manganese oxide as a catalyst was 1,610 mAh/g, which was a value larger than that in Experiment Example 3 of the second embodiment. Likewise, as shown in Table 4-2, the initial discharge capacity of an air battery (the anode was zinc) including an air electrode using the bicontinuous body made of bacteria-produced manganese oxide and containing manganese oxide as a catalyst was 810 mAh/g, which was a value larger than that in Experiment Example 3 of the second embodiment.

The bacteria-produced manganese oxide was produced by culturing *Leptothrix discophora* as manganese bacteria in the same manner as described above by using manganese pieces (purity: 99.9% or more, manufactured by KOJUNDO CHEMICAL LABORATORY). *Leptothrix discophora* was purchased from ATCC. Like iron bacteria-produced iron oxide, the discharge capacity presumably improved because the bacteria-produced air electrode having high flexibility efficiently deposited a discharge product, when using the bacteria-produced nanofibers as well.

Experiment Example 5

Experiment Example 5 of the second embodiment will be explained below. In Experiment Example 5, for a case in which a bicontinuous body made of a gel in which bacteria-produced cellulose was dispersed further carried manganese oxide as a catalyst, the method of evaluation of the bicontinuous body, the method of manufacture of an air battery, and the method of a charge/discharge test were performed in the same manner as in Experiment Examples 1 and 2 of the second embodiment.

First, nata de coco (manufactured by Fujicco) was used as a bacterial cellulose gel produced by *Acetobacter xylinum* as acetic acid bacteria, and an air battery was manufactured by the same processes as disclosed in Experiment Examples 1 and 3 of the second embodiment. Note that in Experiment Example 5 of the second embodiment, a bicontinuous body dried in a vacuum was carbonized by being burned in a nitrogen atmosphere at 1,200° C. for 2 hrs, thereby manufacturing an air electrode.

The obtained bicontinuous body (a carbonized bicontinuous body) was evaluated by performing XRD measurement, SEM observation, porosity measurement, a tension test, and BET specific surface area measurement. It was confirmed by the XRD measurement that this bicontinuous body was a carbon (C, PDF card No. 01-071-4630) single phase. Also, it was confirmed by the SEM observation that nanofibers having a diameter of 20 nm continued in the bicontinuous body. In addition, the BET specific surface area of the bicontinuous body was measured by a mercury press-in method and found to be 830 $m^2/g$. The porosity of the bicontinuous body measured by the mercury press-in method was 99% or more. Furthermore, it was confirmed by the result of the tension test that even when a strain of 80% was applied by tensile stress, the bicontinuous body did not exceed the elastic region and restored to the shape before the application of the stress, i.e., the bicontinuous body had high flexibility even after carbonization.

Table 5-1 below shows the discharge capacity of the air battery (the anode was magnesium) in Experiment Example 5 of the second embodiment. Also, Table 5-2 below shows the discharge capacity of the air battery (the anode was zinc) in Experiment Example 5 of the second embodiment. Tables 5-1 and 5-2 also show the results of Experiment Examples 1, 2, 3, and 4 of the second embodiment. In Experiment Example 5 in which the anode was magnesium, and the initial discharge capacity was 1,950 mAh/g, which was a value larger than that when using a bicontinuous body carrying manganese oxide and containing iron bacteria-produced iron oxide as in Experiment Example 4 of the second embodiment. In Experiment Example 5 of the second embodiment in which the anode was zinc, and the initial discharge capacity was 810 mAh/g, which was a value larger than that when using a bicontinuous body carrying manganese oxide and containing iron bacteria-produced iron oxide as in Experiment Example 4 of the second embodiment.

The characteristics improved as described above probably because the use of the bicontinuous body having higher flexibility efficiently deposited the discharge product during discharge, and C having high conductivity enabled a smooth reaction.

In the present invention as described above, a bicontinuous body having high porosity and high flexibility found by BET specific surface area measurement is obtained, and an air battery using this bicontinuous body as an air electrode implements efficient deposition of a discharge product during discharge. The characteristics improve as described above perhaps because the present invention improves various factors.

Experiment Example 6

Experiment Example 6 of the second embodiment will be explained below. In Experiment Example 6, the air battery which is naturally degradable together with the housing explained with reference to FIGS. 7A and 7B was manufactured for a case in which a bicontinuous body made of a gel in which bacteria-produced cellulose was dispersed further carried manganese oxide as a catalyst. The method of synthesis of the bicontinuous body carrying manganese oxide as a catalyst, the method of evaluation of the bicontinuous body, and the method of a charge/discharge test were performed in the same manner as in Experiment Example 5 of the second embodiment.

The method of manufacturing the air battery according to Experiment Example 6 of the second embodiment will be explained below. When making the anode from magnesium, the anode was manufactured by cutting a commercially available metal magnesium plate (thickness: 200 μm, manufactured by Nilaco) into a 20 mm×20 mm square by using scissors. When making the anode from zinc, the anode was manufactured by cutting a commercially available metal zinc plate (thickness: 200 μm, manufactured by Nilaco) into a 20 mm×20 mm square by using scissors.

As an electrolytic solution, a solution prepared by dissolving potassium chloride (KCl, manufactured by KANTO KAGAKU) at a concentration of 1 mol/L in pure water was used. As a separator, a cellulose-based separator (manufactured by NIPPON KODOSHI) for batteries was cut into a 25 mm×25 mm square.

The periphery of the anode made of the metal magnesium plate was fixed to a copper mesh foil (manufactured by MIT Japan) as an anode current collector by spot-welding. Furthermore, this copper mesh foil was cut into 25 mm×25 mm in a planar view, and the end of the cut foil was spot-welded to the short side of a copper foil (manufactured by Nilaco) cut into 3×20 mm.

The periphery of the anode made of the metal zinc plate was fixed to a copper mesh foil (manufactured by MIT Japan) as an anode current collector by spot-welding. Furthermore, this copper mesh foil was cut into 25 mm×25 mm in a planar view, and the end of the cut foil was spot-welded to the short side of a copper foil (manufactured by Nilaco) cut into 3×20 mm as a terminal.

Also, the air electrode was bonded by pressure to a copper mesh foil (manufactured by MIT Japan) cut into 25 mm×25 mm as an air electrode current collector, and the end of this copper mesh foil was spot-welded to the short side of a copper foil (manufactured by Nilaco) cut into 3×20 mm as a terminal.

A plant-based film sheet ECOLOJU (manufactured by Mitsubishi Plastics) was used as the material of the housing. Two cut sheets were formed by cutting this sheet into 30 mm×30 mm in a planar view, one cut sheet was used as a first housing, and the other cut sheet was used as a second housing. Also, a 15 mm×15 mm opening was formed in the central portion of the second housing to be used on the cathode side.

The anode current collector to which the anode was fixed and the separator were arranged on the first housing on the anode side, and the electrolytic solution was injected into the separator. The first housing was covered with the air electrode current collector on which the air electrode was bonded by pressure and with the second housing, and the inner peripheries (width: about 5 mm) of the first and second housings were airtightly adhered by a biodegradable resin (manufactured by MIYOSHI OIL & FAT), thereby manufacturing the air battery.

Table 5-1 shows the discharge capacity of the air battery (the anode was magnesium) in Experiment Example 6 of the second embodiment. In Experiment Example 6 of the second embodiment as shown in Table 5-1, the initial discharge capacity was 1,880 mAh/g, which was almost the same discharge characteristic as that in Experiment Example 5 of the second embodiment. Also, Table 5-2 shows the discharge capacity of the air battery (the anode was zinc) in Experiment Example 6 of the second embodiment. As shown in Table 5-2, in Experiment Example 6 of the second embodiment, the initial discharge capacity was 790 mAh/g, which was almost the same (95% or more) discharge characteristic as that in Experiment Example 5 of the second embodiment.

The air battery in Experiment Example 6 of the second embodiment was installed in soil after being discharged. Consequently, it was possible to visually confirm the decomposition of the housing in about half a month, and the battery completely disappeared in about a month. This shows that microorganisms in soil decomposed the battery by metabolism.

Experiment Example 7

Experiment Example 7 of the second embodiment will be explained below. In Experiment Example 7, a discharge test was conducted on an air battery manufactured following the same procedures as in Experiment Example 6 of the second embodiment, under an environment imitating soil.

Table 5-1 shows the discharge capacity of the air battery (the anode was magnesium) in Experiment Example 7 of the second embodiment. In Experiment Example 7 of the second embodiment as shown in Table 5-1, the initial discharge capacity was 1,530 mAh/g, which was lower than that in Experiment Example 6 of the second embodiment, but this value demonstrates that the battery operated with no problem even under the soil environment.

Table 5-2 shows the discharge capacity of the air battery (the anode was zinc) in Experiment Example 7 of the second embodiment. In Experiment Example 7 of the second embodiment as shown in Table 5-2, the initial discharge capacity was 690 mAh/g, which was lower than that in Experiment Example 6 of the second embodiment, but this value demonstrates that the battery operated with no problem even under the soil environment. The capacity decreased presumably because the temperature in soil was unstable.

Also, when the air battery in Experiment Example 7 of the second embodiment was left to stand in soil after being discharged, the battery completely disappeared in about a month from the start of the discharge test.

Comparative Example 1

Next, Comparative Example 1 will be explained. In Comparative Example 1, an air battery cell using carbon (Ketjen black EC600JD) well known as an air electrode and manganese oxide was manufactured and evaluated. In Comparative Example 1, a coin-cell air battery similar to that in Experiment Example 1 of the second embodiment was manufactured.

Manganese oxide powder (manufactured by KANTO KAGAKU), Ketjen black powder (manufactured by LION), and polytetrafluoroethylene (PTFE) powder (manufactured by DAIKIN) were sufficiently pulverized and mixed at a weight ratio of 50:30:20 by using a mortar machine, and roll forming was performed on the obtained mixture, thereby manufacturing a sheet-like electrode (thickness: 0.5 mm). An air electrode was obtained by cutting this sheet-like electrode into a circular shape having a diameter of 14 mm. The conditions of a battery discharge test were the same as in Experiment Example 1 of the second embodiment.

Table 5-1 shows the discharge capacity of the air battery (the anode was magnesium) according to Comparative Example 1, together with the results of Experiment Examples 1 to 7 of the second embodiment. As shown in Table 5-1, the initial discharge capacity of Comparative Example 1 was 750 mAh/g, which was a value smaller than that in Experiment Example 1 of the second embodiment.

Table 5-2 shows the discharge capacity of the air battery (the anode was zinc) according to Comparative Example 1, together with the results of Experiment Examples 1 to 7 of the second embodiment. As shown in Table 5-2, the initial discharge capacity of Comparative Example 1 was 360 mAh/g, which was a value smaller than that in Experiment Example 1 of the second embodiment.

Also, the air electrode of Comparative Example 1 was observed after the measurements. Consequently, the air electrode partially broke and dispersed in the electrolytic solution, and it was found that the electrode structure of the air electrode was destroyed.

TABLE 5-1

| Experiment Example | Average discharge voltage (V) | Discharge capacity (mAh/g) |
|---|---|---|
| Experiment Example 1 (graphene) | 1.2 | 1,110 |
| Experiment Example 2 (carbon nanofiber) | 1.3 | 1,160 |
| Experiment Example 3 ($MnO_2$/carbon nanofiber) | 1.3 | 1,550 |
| Experiment Example 4 ($MnO_2$/bacteria-produced iron oxide) | 1.3 | 1,770 |
| Experiment Example 5 ($MnO_2$/carbonized bacterial cellulose) | 1.5 | 1,950 |
| Experiment Example 6 ($MnO_2$/carbonized bacterial cellulose) | 1.4 | 1,880 |
| Experiment Example 7 ($MnO_2$/carbonized bacterial cellulose) | 1.4 | 1,530 |
| Comparative Example 1 (Ketjen black) | 0.9 | 750 |

TABLE 5-2

| Experiment Example | Average discharge voltage (V) | Discharge capacity (mAh/g) |
|---|---|---|
| Experiment Example 1 (graphene) | 0.9 | 500 |
| Experiment Example 2 (carbon nanofiber) | 1.2 | 580 |
| Experiment Example 3 ($MnO_2$/carbon nanofiber) | 1.2 | 710 |
| Experiment Example 4 ($MnO_2$/bacteria-produced iron oxide) | 1.2 | 720 |
| Experiment Example 5 ($MnO_2$/carbonized bacterial cellulose) | 1.3 | 810 |
| Experiment Example 6 ($MnO_2$/carbonized bacterial cellulose) | 1.1 | 790 |
| Experiment Example 7 ($MnO_2$/carbonized bacterial cellulose) | 0.9 | 690 |
| Comparative Example 1 (Ketjen black) | 0.7 | 360 |

Table 6 below shows similar results of Experiment Examples 1 to 7 and Comparative Example 1 of the second embodiment when manufacturing the anodes from Fe and Al.

TABLE 6

| Experiment Example | Anode | Cathode | Average discharge voltage | Discharge capacity |
|---|---|---|---|---|
| Experiment Example 1 | Fe | Graphene | 0.65 | 420 |
| Experiment Example 2 | Fe | Carbon nanofiber | 0.63 | 380 |
| Experiment Example 3 | Fe | MnO$_2$/carbon nanofiber | 0.70 | 530 |
| Experiment Example 4 | Fe | MnO$_2$/bacteria-produced iron oxide | 0.69 | 520 |
| Experiment Example 5 | Fe | MnO$_2$/carbonized bacterial cellulose | 0.76 | 510 |
| Experiment Example 6 | Fe | MnO$_2$/carbonized bacterial cellulose | 0.65 | 490 |
| Experiment Example 7 | Fe | MnO$_2$/carbonized bacterial cellulose | 0.73 | 460 |
| Comparative Example 1 | Fe | Ketjen black | 0.48 | 140 |
| Experiment Example 1 | Al | Graphene | 0.87 | 1,480 |
| Experiment Example 2 | Al | Carbon nanofiber | 1.02 | 1,550 |
| Experiment Example 3 | Al | MnO$_2$/carbon nanofiber | 0.98 | 2,070 |
| Experiment Example 4 | Al | MnO$_2$/bacteria-produced iron oxide | 0.96 | 2,360 |
| Experiment Example 5 | Al | MnO$_2$/carbonized bacterial cellulose | 1.13 | 2,600 |
| Experiment Example 6 | Al | MnO$_2$/carbonized bacterial cellulose | 1.04 | 2,500 |
| Experiment Example 7 | Al | MnO$_2$/carbonized bacterial cellulose | 1.07 | 2,040 |
| Comparative Example 1 | Al | Ketjen black | 0.67 | 1,000 |

It was confirmed by the above results that the batteries (air batteries) of the second embodiment were superior in capacity and voltage to an air battery using an air electrode made of a well-known material.

In the second embodiment as explained above, the air electrode is made of the bicontinuous body having the three-dimensional network structure including the plurality of nanostructures integrated by noncovalent bonds, and this facilitates handling the air battery. The battery (air battery) of the second embodiment does not contain any metal elements except elements used in fertilizers for soil and metals contained in rainwater and seawater, and is naturally degradable. This extremely decreases the environmental load. A battery like this is effectively usable as a disposable battery in a daily environment, and as various driving sources for, e.g., sensors to be used in soil. In addition, the second embodiment can increase the discharge capacity of a battery.

Third Embodiment

Figure 11:
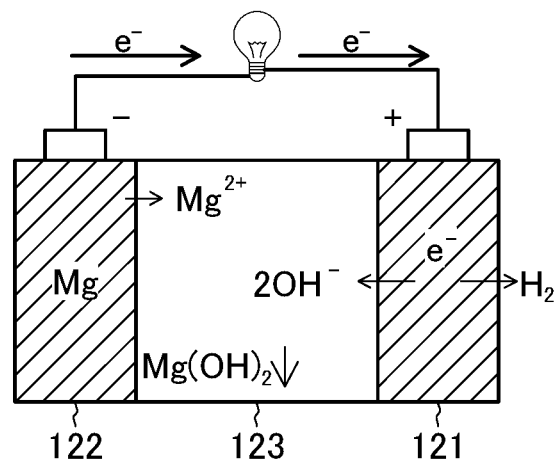
FIG. 11 is a view showing the arrangement of a battery according to the third embodiment.

A battery according to the third embodiment of the present invention will be explained below with reference to FIG. 11. This battery according to the third embodiment is a water battery including a cathode 121, an anode 122, and an electrolyte 123 sandwiched between the cathode 121 and anode 122 and made of a salt. The anode 122 contains, e.g., magnesium, iron, or aluminum.

Unlike the air battery, one surface of the cathode 121 of the water battery need not be exposed to the atmosphere. In the water battery, the cathode 121 uses water as an active material. Note that the electrolyte 123 can be either an electrolytic solution or solid electrolyte. The electrolytic solution is an electrolyte in a liquid state. The solid electrolyte is an electrolyte in a gel state or solid state.

In the battery (water battery) according to the third embodiment, the cathode 121 is made of a bicontinuous body given a three-dimensional network structure because a plurality of integrated nanostructures have branches. For example, the plurality of nanostructures are integrated by noncovalent bonds. The bicontinuous body is a porous body and has an integrated structure. The nanostructures are nanosheets or nanofibers. In the bicontinuous body given the three-dimensional network structure because the plurality of integrated nanostructures have branches, the branched portions of the nanostructures are deformable, and this gives the bicontinuous body a flexible structure.

The nanosheet may be made of at least one of, e.g., carbon, iron oxide, manganese oxide, magnesium oxide, molybdenum oxide, and a molybdenum sulfide compound. Examples of the molybdenum sulfide compound are molybdenum disulfide and phosphorus-doped molybdenum sulfide. The elements of these materials may be 16 types of essential elements (C, O, H, N, P, K, S, Ca, Mg, Fe, Mn, B, Zn, Cu, Mo, and Cl) indispensable to the growth of plants. The elements of these materials may also be Na, Si, Se, Co, Al, and V useful to the growth of plants.

It is important that the nanosheet has conductivity. The nanosheet is defined as a sheet-like substance having a thickness of 1 nm to 1 μm and having planar longitudinal and lateral lengths which are 100 times or more the thickness. An example of a carbon nanosheet is graphene. The nanosheet may also be a roll-like sheet or wave-like sheet, or curved or bent, i.e., can have any shape.

The nanofiber may be made of at least one of carbon, iron oxide, manganese oxide, magnesium oxide, molybdenum oxide, molybdenum sulfide, and cellulose (carbonized cellulose). The elements of these materials may be 16 types of essential elements (C, O, H, N, P, K, S, Ca, Mg, Fe, Mn, B, Zn, Cu, Mo, and Cl) indispensable to the growth of plants. The elements of these materials may also be Na, Si, Se, Co, Al, and V useful to the growth of plants.

It is important that the nanofiber has conductivity as well. The nanofiber is defined as a fibrous substance having a diameter of 1 nm to 1 μm and a length which is 100 times or more the diameter. The nanofiber may also be a hollow fiber or coil-like fiber, i.e., can have any shape. Note that cellulose is given conductivity by carbonization as will be described later.

For example, the bicontinuous body as the cathode 121 can be manufactured by first obtaining a frozen body by freezing a sol or gel in which the nanostructures are dispersed (a freezing step), and drying the frozen body in a vacuum (a drying step). Predetermined bacteria can produce a gel in which nanofibers of iron oxide, manganese oxide, or cellulose are dispersed (a gel producing step).

It is also possible to obtain the bicontinuous body by causing predetermined bacteria to produce a gel in which cellulose nanofibers are dispersed (a gel producing step), and carbonizing the gel by heating it in an inert gas atmosphere (a carbonizing step).

The bicontinuous body forming the cathode 121 has an average pore size of preferably 0.1 to 50 μm, and more preferably 0.1 to 2 μm. The average pore size is a value obtained by a mercury press-in method.

The cathode 121 does not require any additional material, e.g., a binder such as when using a carbon powder, and this is advantageous in both cost and environmental conservation.

Electrode reactions in the cathode 121 and anode 122 will be explained below. In the cathode reaction, water (the electrolyte 123) comes in contact with the surface of the cathode 121 having conductivity, so a reaction indicated by "$2H_2O+2e^-\rightarrow 2OH^-+H_2$ ... (6)" progresses. On the other hand, in the anode reaction when the anode is made of magnesium, a reaction "$Mg\rightarrow Mg^{2+}+2e^-$ ... (7)" progresses in the anode 122 in contact with the electrolyte 123, so magnesium forming the anode 122 releases electrons and dissolves as magnesium ions in the electrolyte 123.

These reactions enable discharge. The overall reaction is "$Mg+2H_2O+2e^-\rightarrow Mg(OH)_2+H_2$ ... (8)", and this reaction generates magnesium hydroxide and hydrogen. The theoretical electromotive force is about 1.4 V. FIG. 11 shows the compounds involved in the above reactions, together with the constituent elements.

Thus, the reaction indicated by formula (6) progresses on the surface of the cathode 121 in the water battery, so it is presumably favorable to generate a large amount of reaction sites inside the cathode 121.

The cathode 121 as a cathode can be manufactured by well-known processes such as molding a carbon powder by a binder. As described above, however, it is important to generate a large amount of reaction sites inside the cathode 121 of the battery (water battery) of the third embodiment, so the cathode 121 desirably has a large specific surface area. For example, in the present invention, the specific surface area of the bicontinuous body forming the cathode 121 is preferably 200 m²/g or more, and more preferably 300 m²/g or more.

If the specific surface area of a conventional cathode manufactured by molding a carbon powder by a binder and pelletizing the molded carbon powder is increased, the binding strength between the carbon powder particles decreases, and the structure deteriorates. This makes stable discharge difficult, and decreases the discharge capacity.

By contrast, the cathode 121 of the present invention made of the bicontinuous body given the three-dimensional network structure because the plurality of integrated nanostructures have branches as described previously can solve the above-described conventional problem, and increase the discharge capacity.

The cathode 121 may also carry a catalyst. This catalyst may be made of at least one metal selected from iron, manganese, zinc, copper, and molybdenum, or a metal oxide of at least one metal selected from calcium, iron, manganese, zinc, copper, and molybdenum. Note that the elements of these materials may be made of metals included in 16 types of essential elements indispensable to the growth of plants, and have catalytic activity. The elements of these materials may also be Na, Si, Se, Co, Al, and V useful to the growth of plants. Iron, manganese, and zinc are favorable as metals, and an oxide made of one of these metals or a mixed oxide made of two or more of these metals is preferable. Manganese oxide ($MnO_2$) is particularly suitable. Manganese oxide is suitable because it shows especially high catalytic performance in the present invention.

The metal oxide to be used as a catalyst is also preferably an amorphous hydrate. An example is a hydrate of the above-described transition metal oxide. More specifically, a manganese oxide (IV)-n hydrate is favorable. Note that n is the number of moles of $H_2O$ with respect to 1 mol of $MnO_2$. High battery performance can be obtained by carrying nanosized particles of a manganese oxide hydrate by high dispersion on the surface of the bicontinuous body forming the cathode 121.

For example, high battery performance can be obtained by using, as the cathode 121, a structure in which nanosized particles of a manganese oxide hydrate ($MnO_2 \cdot nH_2O$) are adhered (added) by high dispersion on the bicontinuous body of the cathode 121. The content of the catalyst contained in the cathode 121 is 0.1 to 70 wt %, and preferably, 1 to 30 wt % based on the total weight of the cathode 121. The battery performance greatly improves when the transition metal oxide is added as a catalyst to the cathode 121. An electrolytic solution of the electrolyte 123 penetrates into the cathode 121, thereby forming an electrolytic solution-electrode interface as described above. If the catalyst is highly active in this interface site, water reduction (discharge) on the electrode surface smoothly progresses, and the battery performance greatly improves.

In the water battery, reaction portions [the abovementioned electrolytic solution/electrode interface portions] which cause the electrode reactions desirably exist as many as possible, in order to increase the efficiency of the battery as described above. From this point of view, it is important that a large amount of above-described interface portions exist on the surface of the catalyst, and the catalyst preferably has a large specific surface area. The specific surface area of the catalyst made of a metal or metal oxide may be 0.1 to 1,000 m²/g, and preferably, 1 to 500 m²/g. Note that the specific surface area is obtained by a well-known BET method using $N_2$ adsorption.

The cathode 121 to which the catalyst is added can be manufactured by a method of manufacturing the cathode 121 to be described later.

The anode 122 will now be explained. The anode 122 is made of an anode active material. This anode active material is not particularly limited as long as the substance is a material which can be used as an anode material of the water battery, i.e., metal magnesium, a magnesium-containing substance, metal iron, an iron-containing substance, metal aluminum, or an aluminum-containing substance. For example, the anode 122 may be made of, e.g., metal magnesium, a metal magnesium sheet, or a material obtained by bonding a magnesium powder on a metal foil such as a copper foil by pressure.

The anode 122 can be formed by well-known methods. For example, when using a magnesium metal as the anode 122, the anode 122 can be manufactured by piling up a plurality of metal magnesium foils and forming the piled foils into a predetermined shape.

The electrolyte 123 will be explained below. The electrolyte 123 may be a substance through which ions of the metal (e.g., magnesium) forming the anode 122 and hydroxide ions can move between the cathode 121 and anode 122. An example is a metal salt containing potassium and sodium abundantly existing on the earth. Note that this metal salt may be made of 16 types of essential elements (C, O, H, N, P, K, S, Ca, Mg, Fe, Mn, B, Zn, Cu, Mo, and Cl) indispensable to the growth of plants, or elements contained in seawater or rainwater. For example, the electrolyte 123 may be made of sodium chloride or potassium chloride. Potassium is one of major elements among other fertilizer components. Therefore, potassium chloride is particularly favorable because potassium chloride exerts no influence even if the electrolyte leaks out into soil, and functions as a fertilizer as well.

As another material forming the electrolyte 123, it is also possible to use an aromatic anion-exchange polymer solid electrolyte or inorganic lamellar compound-based solid electrolyte having ion conductivity by which magnesium ions and hydroxide ions pass through the electrolyte.

Note that in addition to the abovementioned arrangement, the water battery can include structural members such as a separator, a battery case, and a metal foil (e.g., a copper foil), and elements required of a general air battery. Conventionally known members and elements can be used as these members and elements. The separator is not particularly limited as long as it is a fibrous material, but a cellulose-based separator made of plant fibers or bacteria is particularly favorable.

Manufacturing methods of the third embodiment will be explained below. The water battery of the third embodiment can be manufactured by appropriately arranging the cathode 121 obtained by a cathode manufacturing method to be described below, the anode 122, and the electrolyte 123, together with other necessary elements based on the structure of a desired water battery, in an appropriate vessel such as a case. Conventionally known methods for a general air battery can be applied as these water battery manufacturing procedures.

The manufacture of the cathode 121 will be explained below.

[Manufacturing Method 1]

Figure 12:
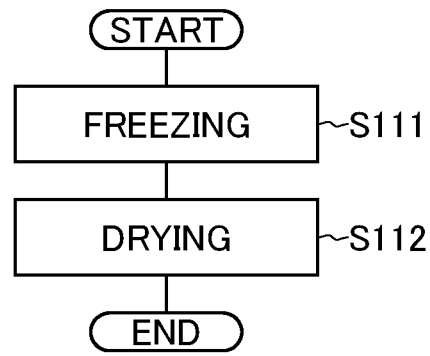
FIG. 12 is a flowchart for explaining manufacturing method 1 according to the third embodiment of the present invention.

First, manufacturing method 1 according to the third embodiment will be explained with reference to FIG. 12. First, in step S111, a frozen body is obtained by freezing a sol or gel in which nanostructures such as nanosheets or nanofibers are dispersed (a freezing step). Then, in step S112, a bicontinuous body is obtained by drying the obtained frozen body in a vacuum (a drying step).

Each step will be explained in more detail below. The freezing step in step S111 is a step of maintaining or constructing a three-dimensional network structure by using a plurality of nanostructures as the material of a flexible bicontinuous body given the three-dimensional network structure because the integrated nanostructures have branches.

The gel means a solid dispersion medium having lost fluidity due to the three-dimensional network structure including the nanostructures as dispersoids. More specifically, the gel means a dispersion system having a shear elastic modulus of $10^2$ to $10^6$ Pa. The dispersion medium of the gel is a water system such as water ($H_2O$), or an organic system such as carboxylic acid, methanol ($CH_3OH$), ethanol ($C_2H_5OH$), propanol ($C_3H_7OH$), n-butanol, isobutanol, n-butylamine, dodecane, unsaturated fatty acid, ethyleneglycol, heptane, hexadecane, isoamylalcohol, octanol, isopropanol, acetone, or glycerin, and it is also possible to mix two or more types thereof.

The sol means a colloid including a dispersion medium and the nanostructures as dispersoids. More specifically, the sol means a dispersion system having a shear elastic modulus of 1 Pa or less. The dispersion medium of the sol is a water system such as water, or an organic system such as carboxylic acid, methanol, ethanol, propanol, n-butanol, isobutanol, n-butylamine, dodecane, unsaturated fatty acid, ethyleneglycol, heptane, hexadecane, isoamylalcohol, octanol, isopropanol, acetone, or glycerin, and it is also possible to mix two or more types thereof.

The freezing step is performed by, e.g., placing the sol or gel in which the nanostructures are dispersed in an appropriate vessel such as a test tube, and freezing the sol or gel placed in the test tube by cooling the surrounding of the test tube by a coolant such as liquid nitrogen. The method of freezing is not particularly limited as long as the dispersion medium of the gel or sol can be cooled to the freezing point or lower, and cooling can also be performed by using a freezer or the like.

By freezing the sol or gel, the dispersion medium loses fluidity, the dispersoids are fixed, and the three-dimensional network structure is constructed. In the freezing step, the specific surface area can freely be adjusted by adjusting the concentration of the sol or gel, and the specific surface area of the obtained bicontinuous body increases as the concentration of the sol or gel decreases. If the concentration becomes 0.01 wt % or less, however, it becomes difficult for the dispersoids to construct the three-dimensional network structure. Therefore, the concentration of the dispersoids is preferably 0.01 to 10 wt % or less.

Since the three-dimensional network structure having a large specific surface area is constructed by using the nanostructures such as nanofibers or nanosheets, this structure has high flexibility when contracted or expanded because pores function as cushions. More specifically, the bicontinuous body desirably has a distortion of 5% or more, and more desirably, 10% or more at the elastic limit.

If the dispersoids are not fixed by freezing, the dispersoids flocculate as the dispersion medium evaporates in the subsequent drying step, so a sufficient specific surface area cannot be obtained. This makes it difficult to manufacture the bicontinuous body having the three-dimensional network structure.

The drying step in step S112 will now be explained. The drying step is a step of extracting, from the frozen body obtained in the freezing step, the dispersoids (the plurality of integrated nanostructures) maintaining or constructing the three-dimensional network structure from the dispersion medium.

In the drying step, the frozen body obtained in the freezing step is dried in a vacuum, thereby sublimating the frozen dispersion medium from the solid state. For example, this step is performed by placing the obtained frozen body in an appropriate vessel such as a flask, and drawing a vacuum in the vessel. Since the frozen body is placed in the vacuum atmosphere, the sublimation point of the dispersion medium decreases, and this makes it possible to sublimate a substance which does not sublimate at atmospheric pressure.

The degree of vacuum in the drying step changes in accordance with a dispersion medium to be used, and is not particularly limited as long as the dispersion medium sublimates. For example, when using water as the dispersion medium, the degree of vacuum must be set such that the pressure is 0.06 MPa or less, but the drying time prolongs because heat is lost as latent heat of sublimation. Therefore, the degree of vacuum is preferably $1.0 \times 10^{-6}$ to $1.0 \times 10^{-2}$ Pa. It is also possible to add heat during drying by using a heater or the like.

In a method of performing drying in the atmosphere, the dispersion medium changes from a solid to a liquid, and the liquid becomes a gas after that. Consequently, the frozen body changes into a liquid state and becomes fluid again in the dispersion medium, so the three-dimensional network structure of the plurality of nanostructures collapses. This makes it difficult to manufacture a flexible bicontinuous body by performing drying in the atmospheric-pressure atmosphere.

[Manufacturing Method 2]

Figure 13:
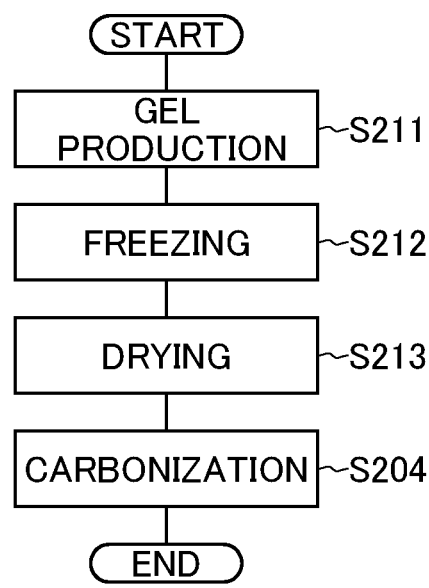
FIG. 13 is a flowchart for explaining manufacturing method 2 according to the third embodiment of the present invention.

Manufacturing method 2 according to the third embodiment will be explained below with reference to FIG. 13.

First, in step S211, a gel in which nanofibers made of iron oxide, manganese oxide, or cellulose are dispersed is produced by using predetermined bacteria (a gel producing step). A bicontinuous body is manufactured by using the gel obtained as described above.

This gel produced by the bacteria has an nm-order fiber as a basic structure, so the bicontinuous body manufactured by using this gel has a large specific surface area. Since the cathode of the water battery desirably has a large specific surface area as described earlier, the use of the gel produced by the bacteria is favorable. More specifically, the use of the gel produced by bacteria makes it possible to synthetize a cathode (bicontinuous body) having a specific surface area of 300 m$^2$/g or more.

A bacteria-produced gel has a structure in which fibers get entangled into the form of a coil or mesh, and further has a structure in which nanofibers branch based on the growth of bacteria. Consequently, a manufacturable bicontinuous body has a distortion of 50% or more at the elastic limit, i.e., realizes high flexibility. Therefore, a bicontinuous body manufactured by using the bacteria-produced gel is suitable for the cathode of the water battery.

As the bacteria-produced gel, it is possible to mix two or more types of bacterial cellulose, iron oxide, and manganese oxide.

Examples of the bacteria are well-known bacteria. Examples are acetobacters such as *Acetobacter xylinum* subspecies *sucrofermentans, Acetobacter xylinum* ATCC23768, *Acetobacter xylinum* ATCC23769, *Acetobacter pastorianus* ATCC10245, *Acetobacter xylinum* ATCC14851, *Acetobacter xylinum* ATCC11142, and *Acetobacter xylinum* ATCC10821, *Agrobacterium, Rhizobium, Sarcina, Pseudomonas, Achromobacter, Alcaligenes, Aerobacter, Azotobacter, Zooglea, Enterobacter, Kluyvera, Leptothrix, Gallionella, Siderocapsa, Thiobacillus*, and bacteria produced by culturing various mutant strains created by mutating the above bacteria by well-known methods using NTG (nitrosoguanidine) and the like.

As a method of obtaining the bicontinuous body by using the above-described bacteria-produced gel, it is possible to obtain a frozen body by freezing the gel in step S212 (a freezing step), and obtain the bicontinuous body by drying the frozen body in a vacuum in step S213 (a drying step), in the same manner as in manufacturing method 1 of the third embodiment. However, when using a gel in which nanofibers made of bacteria-produced cellulose are dispersed, the obtained bicontinuous body is carbonized by heating in a gas atmosphere in which the cellulose is not burned, in step S214 (a carbonizing step).

The bacterial cellulose as a component contained in the bacteria-produced gel has no conductivity. When using the bacterial cellulose as a cathode, therefore, the carbonizing step of giving conductivity by carbonizing the bicontinuous body by heating in an inert gas atmosphere is important. The bicontinuous body thus carbonized has high conductivity, a high corrosion resistance, high flexibility, and a large specific surface area, and hence is suitable as the cathode of the water battery.

The bacterial cellulose can be carbonized by calcination in an inert gas atmosphere at 500° C. to 2,000° C., and more preferably, 900° C. to 1,800° C., after the bicontinuous body having the three-dimensional network structure made of the bacterial cellulose is synthesized in the above-described freezing step and drying step. The gas which does not burn the cellulose can be an inert gas such as nitrogen gas or argon gas. This gas may also be a reducing gas such as hydrogen gas or carbon monoxide gas, or carbon dioxide gas. In the present invention, it is more preferable to use carbon dioxide gas or carbon monoxide gas having an activation effect to a carbon material and expectedly capable of highly activating the bicontinuous body.

[Manufacturing Method 3]

Figure 14:
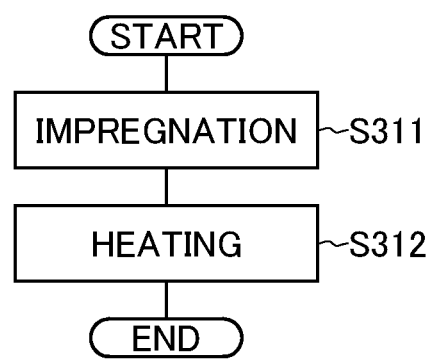
FIG. 14 is a flowchart for explaining manufacturing method 3 according to the third embodiment of the present invention.

Manufacturing method 3 according to the third embodiment will be explained below with reference to FIG. 14. As described previously, the cathode preferably carries a catalyst. In step S311, the bicontinuous body obtained by manufacturing method 1 or 2 of the third embodiment described above is impregnated with an aqueous solution of a metal salt as a precursor of a catalyst (an impregnating step). After the flexible bicontinuous body containing the metal salt is thus prepared, the flexible bicontinuous body containing the metal salt is heated in step S312 (a heating step). Note that a favorable metal of the metal salt to be used is at least one metal selected from the group consisting of iron, manganese, zinc, copper, and molybdenum, and manganese is particularly favorable.

Conventionally known methods can be used to cause the bicontinuous body to carry a transition metal oxide. For example, there is a method of impregnating the bicontinuous body with an aqueous solution of a transition metal chloride or transition metal nitrate and evaporating the bicontinuous body to dryness, and hydrothermally synthesizing the bicontinuous body in water (H$_2$O) at high temperature and high pressure. There is also a sedimentation method of impregnating the bicontinuous body with an aqueous solution of a transition metal chloride or transition metal nitrate, and dropping an aqueous alkaline solution onto the bicontinuous body. Furthermore, there is a sol-gel method of impregnating the bicontinuous body with a transition metal alkoxide solution, and hydrolyzing the bicontinuous body. The conditions of these liquid phase methods are well known, so these well-known conditions are applicable. In the present invention, the liquid phase methods are favorable.

A metal oxide carried by the abovementioned liquid phase methods is in an amorphous state in many cases because crystallization has not progressed. A crystalline metal oxide can be obtained by heating the amorphous precursor in an inert atmosphere at a high temperature of about 500° C. A crystalline metal oxide like this shows high performance even when used as a catalyst of the cathode.

On the other hand, a precursor powder obtained when drying the abovementioned amorphous precursor at a relatively low temperature of about 100° C. to 200° C. is in a hydrate state while maintaining the amorphous state. This hydrate of the metal oxide can formally be represented by Me$_x$O$_y$·nH$_2$O (where Me means the abovementioned metal, x and y respectively represent the number of metals and the number of oxygens contained in metal oxide molecules, and n is the number of mols of H$_2$O with respect to 1 mol of the metal oxide). The metal oxide hydrate obtained by low-temperature drying as described above can be used as a catalyst.

The amorphous metal oxide (hydrate) is hardly sintered, and hence has a large surface area and a very small particle size of about 30 nm. Therefore, this amorphous metal oxide is suitable as a catalyst, and high battery performance can be obtained by using this.

As described above, the crystalline metal oxide shows high activity, but the metal oxide crystallized by heating at a high temperature as described above sometimes significantly reduces the surface area, and the particle size sometimes becomes about 100 nm due to flocculation of the particles. Note that this particle size (average particle size) is a value obtained by measuring the diameters of particles in a 10-μm square area (10 μm×10 μm) by observing the particles in an enlarged scale by using a scanning electron microscope (SEM), and calculating the average value.

Also, it is sometimes difficult to add particularly the metal oxide catalyst heated at a high temperature to the surface of the bicontinuous body by high dispersion because the particles flocculate. To obtain a sufficient catalyst effect, it is sometimes necessary to add a large amount of the metal oxide into the cathode (bicontinuous body), so the manufacture of a catalyst by high-temperature heating is sometimes disadvantageous in cost.

This problem can be solved by using manufacturing method 4, 5, or 6 below.

[Manufacturing Method 4]

Figure 15:
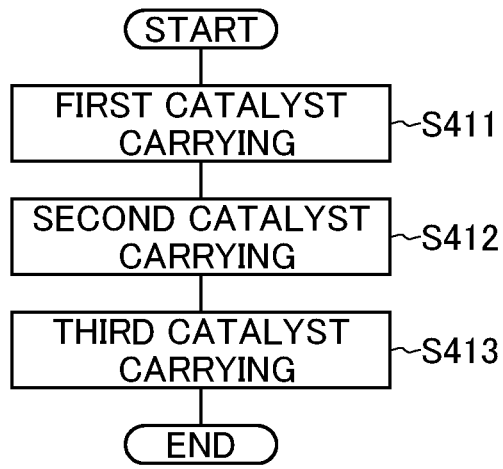
FIG. 15 is a flowchart for explaining manufacturing method 4 according to the third embodiment of the present invention.

Manufacturing method 4 according to the third embodiment will be explained below with reference to FIG. 15.

Manufacturing method 4 of the third embodiment causes the bicontinuous body manufactured as explained in manufacturing method 1 or 2 of the third embodiment to carry a catalyst. In manufacturing method 4 of the third embodiment, the following catalyst carrying steps of causing the bicontinuous body to carry a catalyst are added to the manufacture of the bicontinuous body described above.

First, in a first catalyst carrying step of step S411, the bicontinuous body is dipped in an aqueous solution of a surfactant to adhere the surfactant on the surface of the bicontinuous body.

Then, in a second catalyst carrying step of step S412, an aqueous solution of a metal salt is used to adhere the metal salt on the surface of the bicontinuous body by the surfactant adhered on the surface of the bicontinuous body.

Subsequently, in a third catalyst carrying step of step S413, the bicontinuous body on which the metal salt is adhered is heated, thereby causing the bicontinuous body to carry a catalyst made of a metal or metal oxide forming the metal salt.

Note that the abovementioned metal is at least one metal selected from iron, manganese, zinc, copper, and molybdenum, or a metal oxide of at least one metal selected from calcium, iron, manganese, zinc, copper, and molybdenum. Mn or manganese oxide ($MnO_2$) is particularly favorable.

The surfactant used in the first catalyst carrying step of manufacturing method 4 of the third embodiment has a function of carrying a metal or transition metal oxide on the cathode (bicontinuous body) by high dispersion. The surfactant has, in the molecules, a hydrophobic group which is adsorbed to the carbon surface and a hydrophilic group which adsorbs transition metal ions, and hence can adsorb metal ions as the transition metal oxide precursor to the bicontinuous body by a high dispersion degree.

The above-described surfactant is not particularly limited as long as the surfactant has, in its molecules, a hydrophobic group which is adsorbed to the carbon surface and a hydrophilic group which adsorbs manganese ions, but nonionic surfactants are favorable. Examples of an ester-type surfactant are glycerin laurate, glycerin monostearate, sorbitan fatty acid ester, and sucrose fatty acid ester. Examples of an ether-type surfactant are polyoxyethylene alkyl ether, polyoxyethylene alkylphenyl ether, and polyoxyethylene polyoxypropylene glycol.

Examples of an ester ether-type surfactant are polyoxyethylene sorbitan fatty acid ester, polyoxyethylene hexytan fatty acid ester, and sorbitan fatty acid ester polyethylene glycol. Examples of an alkanol amide-type surfactant are diethanol amide laurate, diethanol amide oleate, diethanol amide stearate, and cocamide DEA. Examples of a higher-alcohol surfactant are cetanol, stearyl alcohol, and oleyl alcohol. An example of a poloxamer-type surfactant is poloxamer dimethacrylate.

The concentration of the aqueous surfactant solution in the first catalyst carrying step of manufacturing method 4 of the third embodiment is preferably 0.1 to 20 g/L. Also, the dipping conditions such as the dipping time and dipping temperature include dipping the bicontinuous body in a solution at room temperature to 50° C. for 1 to 48 hrs.

The second catalyst carrying step of manufacturing method 4 of the third embodiment includes further dissolving a metal salt which functions as a catalyst in the aqueous surfactant-containing solution in the first catalyst carrying step, or adding an aqueous solution of the metal salt to the aqueous surfactant-containing solution. Alternatively, it is also possible to prepare an aqueous solution in which the metal salt functioning as a catalyst is dissolved in addition to the above-described aqueous surfactant-containing solution, and dip the bicontinuous body which is impregnated with the surfactant (to which the surfactant is adhered) in the aqueous metal salt solution.

The bicontinuous body to which the surfactant is adhered may also be impregnated with the aqueous solution in which the metal salt is dissolved. It is also possible to drop an alkaline aqueous solution in the obtained bicontinuous body which contains the metal salt (to which the metal salt is adhered). Consequently, the metal or metal oxide precursor can be adhered to the bicontinuous body.

The addition amount of the metal salt in the second catalyst carrying step of manufacturing method 4 of the third embodiment is preferably 0.1 to 100 mmol/L. The dipping conditions such as the dipping time and dipping temperature include dipping the bicontinuous body in a solution at room temperature to 50° C. for 1 to 48 hrs.

More specifically, the method will be explained by taking manganese as an example of the metal. For example, a manganese metal salt (e.g., manganese halide such as manganese chloride or its hydrate) is added to an aqueous solution which contains the surfactant and with which the bicontinuous body is impregnated. Then, an alkaline aqueous solution is dropped on the obtained bicontinuous body containing the manganese metal salt, thereby causing the bicontinuous body to carry manganese hydroxide as a metal or metal oxide precursor.

The catalyst carrying amount by manganese oxide described above can be adjusted by the concentration of the metal salt (e.g., manganese chloride) in the aqueous metal salt solution.

Examples of the alkali to be used in the above-described alkaline aqueous solution are a hydroxide of an alkali metal or alkali earth metal, ammonia water, an aqueous ammonium solution, and an aqueous tetramethylammoniumhydroxide (TMAH) solution. The concentration of these alkaline aqueous solutions is preferably 0.1 to 10 mol/L.

In the third catalyst carrying step of manufacturing method 4 of the third embodiment, a precursor (metal salt) of the metal or metal oxide adhered on the surface of the bicontinuous body is changed into the metal itself or the metal oxide by heating.

More specifically, the bicontinuous body on which the precursor is adhered is dried at room temperature (about 25° C.) to 150° C., and more preferably, 50° C. to 100° C. for 1 to 24 hrs, and then heated at 100° C. to 600° C., and preferably, 110° C. to 300° C.

In the third catalyst carrying step of manufacturing method 4 of the third embodiment, a cathode made of a bicontinuous body on the surface of which a metal itself is adhered as a catalyst can be manufactured by performing heating in an inert atmosphere or reducing atmosphere such as argon, helium, or nitrogen. Also, a cathode made of a bicontinuous body on the surface of which a metal oxide is adhered as a catalyst can be manufactured by performing heating in an oxygen-containing gas (oxidizing atmosphere).

Furthermore, heating is performed under the above reducing condition, and a cathode made of a bicontinuous body on which a metal oxide is adhered as a catalyst can be manufactured by forming a bicontinuous body on which a metal itself is adhered as a catalyst, and heating this bicontinuous body in an oxidizing atmosphere.

As another method, it is also possible to dry a bicontinuous body on which a precursor (metal salt) of a metal or metal oxide is adhered at room temperature to 150° C., and more preferably, 50° C. to 100° C., thereby adhering the metal itself on the bicontinuous body, and manufacturing a composite body of the metal/bicontinuous body.

In manufacturing method 4 of the third embodiment, the adhesion amount (content) of the catalyst made of the metal or metal oxide is 0.1 to 70 wt %, and preferably, 1 to 30 wt % based on the total weight of the bicontinuous body and catalyst.

Manufacturing method 4 of the third embodiment can manufacture a cathode in which the catalyst made of the metal or metal oxide is highly dispersed on the surface of the bicontinuous body, and can configure a water battery having excellent battery characteristics.

[Manufacturing Method 5]

Manufacturing method 5 according to the third embodiment will be explained below. In manufacturing method 5 of the third embodiment, the bicontinuous body manufactured as explained in manufacturing method 1 or 2 of the third embodiment is caused to carry a catalyst by a method different from manufacturing method 4 described above. In manufacturing method 5 of the third embodiment, the following catalyst carrying steps of causing the bicontinuous body to carry a catalyst are added to the manufacture of the bicontinuous body described above.

In a first catalyst carrying step, a metal salt is adhered on the surface of the bicontinuous body by dipping the bicontinuous body in an aqueous solution of the metal salt.

Then, in a second catalyst carrying step, the bicontinuous body is caused to carry a catalyst made of a metal forming the metal salt by heating the bicontinuous body on which the metal salt is adhered.

Subsequently, in a third catalyst carrying step, the catalyst is changed into a metal oxide hydrate by causing the bicontinuous body carrying the catalyst to act on high-temperature, high-pressure water.

Note that the abovementioned metal is at least one metal selected from iron, manganese, zinc, copper, and molybdenum, or a metal oxide made of at least one metal selected from calcium, iron, manganese, zinc, copper, and molybdenum. Mn or manganese oxide ($MnO_2$) is particularly favorable.

In the first catalyst carrying step of manufacturing method 5 of the third embodiment, an aqueous solution of a metal salt as a precursor of a metal or metal oxide to be finally used as a catalyst is adhered (carried) on the surface of the bicontinuous body. For example, it is only necessary to prepare an aqueous solution in which the metal salt is dissolved, and impregnate the bicontinuous body with this aqueous solution. The impregnation conditions and the like are the same as the conventional conditions as described previously.

The second catalyst carrying step of manufacturing method 5 of the third embodiment is the same as the third catalyst carrying step of manufacturing method 4 of the third embodiment, and heating may be performed in an inert atmosphere or reducing atmosphere. As explained as another method of the third catalyst carrying step of manufacturing method 4 of the third embodiment, the bicontinuous body on which the precursor is adhered may also be heated (dried) at a low temperature (room temperature to 150° C., and more preferably, 50° C. to 100° C.), thereby adhering the metal on the bicontinuous body.

The cathode 121 using a metal itself as a catalyst shows high activity, but is weak against corrosion and sometimes lacking long-term stability because the catalyst is a metal. By contrast, long-term stability can be realized by changing the metal into a hydrate of a metal oxide by heating in the third catalyst carrying step of manufacturing method 5 of the third embodiment to be described in detail below.

In the third catalyst carrying step of manufacturing method 5 of the third embodiment, the hydrate of the metal oxide is adhered on the bicontinuous body. More specifically, the metal-adhered bicontinuous body obtained in the second catalyst carrying step of manufacturing method 5 of the third embodiment is dipped in high-temperature, high-pressure water, thereby changing the adhered metal into a catalyst made of the metal oxide hydrate.

For example, the metal-adhered bicontinuous body may be dipped in water at 100° C. to 250° C., and more preferably, 150° C. to 200° C., thereby oxidizing the adhered metal into the metal oxide hydrate.

Since the boiling point of water at atmospheric pressure (0.1 MPa) is 100° C., nothing can be dipped in water at 100° C. or more at atmospheric pressure. However, when using a predetermined airtight container and raising the internal pressure of this airtight container to, e.g., 10 to 50 MPa, and preferably, about 25 MPa, the boiling point of water rises in the airtight container, and liquid water at 100° C. to 250° C. can be obtained. The metal can be changed into the metal oxide hydrate by dipping the metal-adhered bicontinuous body in the high-temperature water thus obtained.

[Manufacturing Method 6]

Manufacturing method 6 according to the third embodiment will be explained below. In manufacturing method 6 of the third embodiment, the bicontinuous body manufactured as explained in manufacturing method 1 or 2 of the third embodiment is caused to carry a catalyst by a method different from manufacturing methods 4 and 5 of the third embodiment described above. In manufacturing method 6 of the third embodiment, the following catalyst carrying steps of causing the bicontinuous body to carry a catalyst are added to the manufacture of the bicontinuous body described above.

In a first catalyst carrying step, a metal salt is adhered on the surface of the bicontinuous body by dipping the bicontinuous body in an aqueous solution of the metal salt.

Then, in a second catalyst carrying step, the bicontinuous body is caused to carry a catalyst made of a hydrate of a metal oxide of a metal forming the metal salt by causing the bicontinuous body on which the metal salt is adhered to act on high-temperature, high-pressure water.

Note that the abovementioned metal may be at least one of iron, manganese, zinc, copper, and molybdenum.

The first catalyst carrying step of manufacturing method 6 of the third embodiment is the same as the first catalyst carrying step of manufacturing method 5 of the third embodiment, so an explanation thereof will be omitted.

In the second catalyst carrying step of manufacturing method 6 of the third embodiment, a precursor (the metal salt) adhered on the surface of the bicontinuous body is changed into the hydrate of the metal oxide by heating at a relatively low temperature.

More specifically, the bicontinuous body on which the precursor is adhered is caused to act on the high-temperature, high-pressure water, and dried at a relatively low temperature of about 100° C. to 200° C. Consequently, the precursor changes into a hydrate in which water molecules exist in particles, while maintaining the amorphous state of the precursor. This metal oxide hydrate obtained by low-temperature drying like this is used as a catalyst.

In a cathode manufactured by manufacturing method 6 of the third embodiment, the metal oxide hydrate can be carried in the state of nanosized particles on the bicontinuous body by high dispersion. When using the bicontinuous body like this as a cathode, therefore, the battery can exhibit high battery performance.

The bicontinuous body obtained by each manufacturing method described above can be used as a cathode by being molded into a predetermined shape by well-known procedures. For example, a bicontinuous body not carrying a catalyst and a bicontinuous body carrying a catalyst are processed into the form of a plate or sheet, and the obtained bicontinuous body is cut into a circular shape having a desired diameter (e.g., 23 mm) by using a punching blade, laser cutter, or the like, thereby obtaining a cathode.

The present invention will be explained in more detail below by using experiment examples. First, the configuration of an actually used battery will be explained with reference to FIGS. 16A and 16B.

Batteries using the cathode 121, anode 122, and electrolyte 123 according to the above-described embodiment can be manufactured by conventional shapes such as a coin shape, cylindrical shape, and laminate shape. Conventional methods can be used as methods of manufacturing these batteries.

Figure 16B:
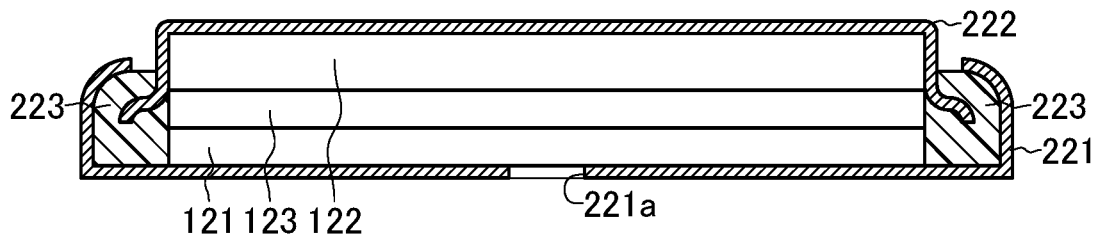
FIG. 16B is a plan view showing a configuration example of the coin-cell battery according to the third embodiment of the present invention.
Figure 16A:
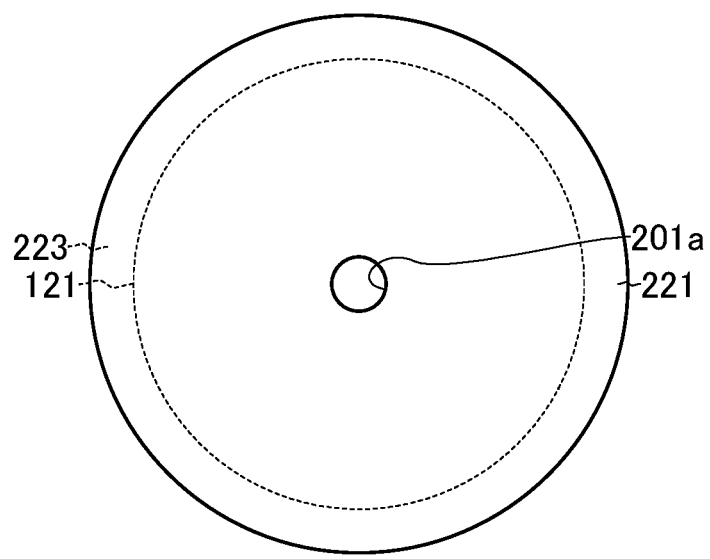
FIG. 16A is a sectional view showing a detailed configuration example of a coin-cell battery according to the third embodiment of the present invention.

As shown in FIGS. 16A and 16B, a coin-cell battery includes the cathode 121, the anode 122, and the electrolyte 123 between them. The electrolyte 123 in this battery is a sheet-like separator impregnated with an electrolytic solution. A cathode case 221 is arranged on the side of the cathode 121, and an anode case 222 is arranged on the side of the anode 122. The cathode 221 has an opening 221a, so a gas generated in the cathode 121 can be released to the atmosphere.

Also, the cathode case 221 and anode case 222 are fitted with each other, and a gasket 223 is placed in the fitted portion. A battery cell is obtained by sandwiching the electrolyte 123 between the cathode 121 and anode 122 and arranged between the cathode case 221 and anode case 222, and the cathode case 221 and anode case 222 are integrated by fitting.

Figure 17:
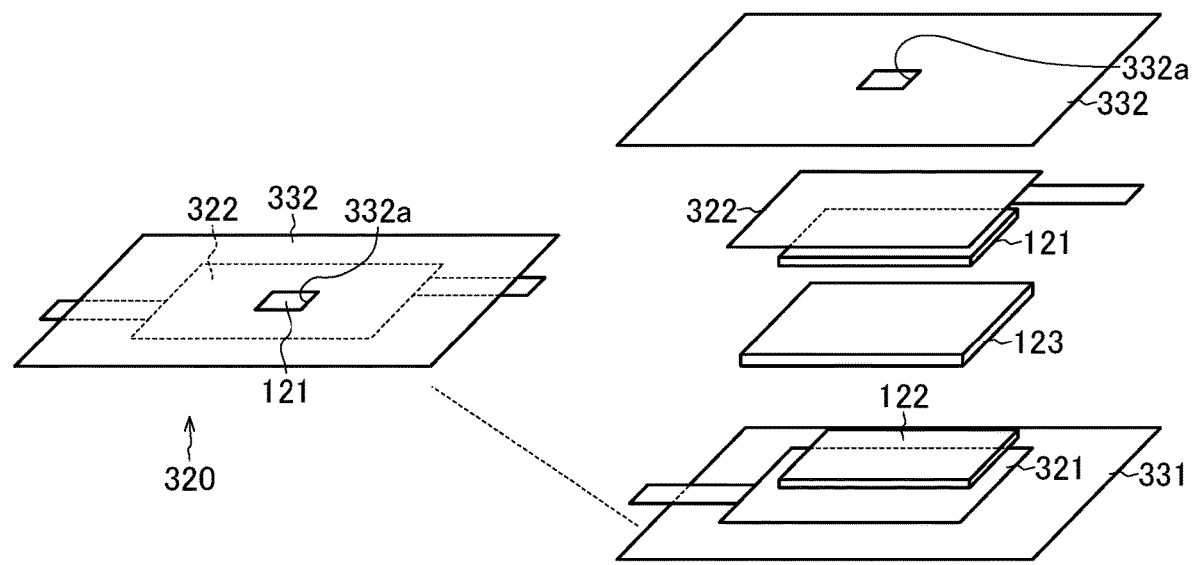
FIG. 17 is a view showing the arrangement of another battery according to the third embodiment of the present invention.

As shown in FIG. 17, it is also possible to accommodate the battery cell in a housing 320 which airtightly closes the interior of the battery cell except the cathode 121. The housing 320 includes a first housing 331 arranged on the side of the anode 122, and a second housing 332 arranged on the side of the cathode 121. An opening 332a is formed in the second housing 332, so a gas generated in the cathode 121 can be emitted (released) to the atmosphere. The housing 320 airtightly closes the interior of the cell except the region of the opening 332a.

Also, an anode current collector 321 is formed between the first housing 331 and anode 122, a cathode current collector 322 is formed between the second housing 332 and cathode 121, and terminals are extracted outside the housing 320 from these current collectors. Note that when using a metal as the anode 122, the terminal can also be extracted outside directly from the anode 122 without using the anode current collector 321.

In this water battery having the above-described configuration, the electrolyte 123 is preferably formed by a sheet of a water-absorbing insulator such as a coffee filter, kitchen paper, or filter paper. As the electrolyte 123, it is particularly favorable to use a sheet of a naturally degradable material such as a cellulose-based separator made of plant fibers.

Also, the housing 320 is preferably made of a naturally degradable material capable of holding the battery cell inside. The housing 320 can be made of any of a natural substance-based material, bacteria-based material, and chemosynthesis-based material. For example, the housing 320 can be made of polylactic acid, polycaprolactone, polyhydroxyalkanoate, polyglycolic acid, modified polyvinyl alcohol, casein, or modified starch. A chemosynthesis-based material such as plant-derived polylactic acid is particularly favorable. In addition, the shape of the housing 320 is not limited as long as the shape can be obtained by processing biodegradable plastic. An example of a material applicable to the housing 320 is a commercially available biodegradable plastic film. It is also possible to use paper on which a coating film made of a resin such as polyethylene is formed and which is used as a milk pack and the like, and an agar film.

It is possible to airtightly close the interior of the battery cell except the cathode 121 by bonding the peripheries of the first and second housings 331 and 332 made of the above-described material. The bonding method is not particularly limited, and examples are heat seal and the use of an adhesive. An adhesive made of a biodegradable resin preferably used. Note that the shape of the cathode 121, anode 122, electrolyte 123, first housing 331, second housing 332, anode current collector 321, and cathode current collector 322 is not limited as long as the layout of these members for operating as a battery is not impaired. For example, these members can be used as a square or circular sheet shape or a rolled shape in a planar view.

The water battery using the housing 320 made of the above-described naturally degradable material is naturally degraded with time when used in a disposable device such as a soil water sensor, and hence need not be collected. Also, the battery is made of a nature-derived material or fertilizer component, so the load on the environment is extremely low. It is unnecessary to collect the battery when it is used not only in soil but also in natural worlds such as woods and seas. When used in an ordinary living environment, the battery can be disposed as burnable waste.

Experiment Example 1

First, Experiment Example 1 of the third embodiment will be explained. Experiment Example 1 is an example in which a bicontinuous body given a three-dimensional network structure because a plurality of integrated nanosheets have branches is used as a cathode. The cathode was synthesized as follows. In the following explanation, a manufacturing method using graphene as nanosheets will be described as a typical example. However, the bicontinuous body having the three-dimensional network structure can be adjusted by changing the material of the nanosheets from graphene to another material. Note that the porosity to be described below was calculated by modeling a pore into a cylindrical shape, from a pore size distribution obtained by performing a mercury press-in method on the bicontinuous body.

First, a commercially available graphene sol [a dispersion medium: water ($H_2O$), 0.4 wt %, manufactured by Sigma-Aldrich] was placed in a test tube, and completely frozen by dipping the test tube in liquid nitrogen for 30 min. After the graphene sol was completely frozen, the frozen graphene sol was taken out into an eggplant flask and dried in a vacuum of 10 Pa or less by using a freeze-drying machine (manufactured by TOKYO RIKAKIKAI), thereby obtaining a flexible bicontinuous body having a three-dimensional network structure including the graphene nanosheets.

The obtained bicontinuous body was evaluated by performing X-ray diffraction (XRD) measurement, scanning electron microscope (SEM) observation, porosity measurement, a tension test, and BET specific surface area measurement. It was confirmed by the XRD measurement that the bicontinuous body manufactured by the present invention was a carbon (C, PDF card No. 01-075-0444) single phase. Note that PDF card No. is the card number of a PDF (Powder Diffraction File) as a database collected by ICDD (International Centre for Diffraction Data), and this similarly applies hereinafter.

It was also confirmed by the SEM observation and mercury press-in method that the obtained bicontinuous body was a bicontinuous body in which the nanosheets (graphene pieces) continued and the average pore size was 1 μm. In addition, the BET specific surface area of the bicontinuous body was measured by the mercury press-in method and found to be 510 $m^2$/g. Also, the porosity of the bicontinuous body was measured by the mercury press-in method and found to be 90% or more. Furthermore, it was confirmed from the result of the tension test that even when a strain of 20% was applied by tensile stress, the obtained bicontinuous body did not exceed the elastic region and restored to the shape before the application of the stress.

The graphene bicontinuous body as described above was punched into a circular shape having a diameter of 14 mm by using a punching blade, laser cutter, or the like, thereby obtaining a cathode.

An anode was adjusted by punching a commercially available metal magnesium plate (thickness: 200 μm, manufactured by Nilaco) into a circular shape having a diameter of 14 mm by using the punching blade, laser cutter, or the like.

As an electrolyte, a solution prepared by dissolving potassium chloride (KCl, manufactured by KANTO KAGAKU) in pure water at a concentration of 1 mol/L was used. As a separator, a cellulose-based separator (manufactured by NIPPON KODOSHI) for batteries was used.

The coin-cell water battery explained with reference to FIGS. 16A and 16B was manufactured by using the cathode, the anode, the electrolytic solution as an electrolyte, and the separator described above. First, the abovementioned cathode was installed in a cathode case in which the periphery of a copper foil (manufactured by Nilaco) was fixed to the inside by spot-welding. Also, the periphery of the anode made of a metal magnesium plate was fixed to a copper foil (manufactured by Nilaco) by spot-welding, and the copper foil was fixed to an anode case by spot-welding. Then, the separator was placed on the cathode installed in the cathode case, and the electrolytic solution was injected into the separator. Subsequently, the cathode case was covered with the anode case to which the anode was fixed, and the peripheries of the cathode case and anode case were caulked by a coin-cell caulking machine, thereby manufacturing a coin-cell water battery including a polypropylene gasket.

Figure 18:
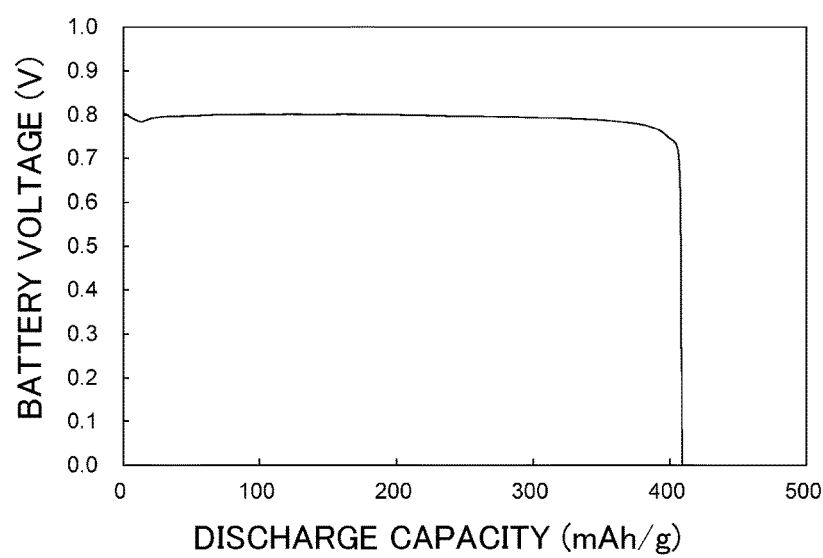
FIG. 18 is a graph showing the initial discharge curve of a water battery according to Experiment Example 1 of the third embodiment of the present invention.

The battery performance of the manufactured coin-cell water battery was measured. First, a discharge test was conducted. This discharge test of the water battery was conducted by using a commercially available charge/discharge measurement system (the SD8 charge/discharge system manufactured by HOKUTO DENKO). An electric current was supplied at a current density of 0.1 mA/$cm^2$ per unit effective area of the cathode, and measurement was performed until the battery voltage decreased to 0 V from the open circuit voltage. This measurement was performed in a thermostatic tank at 25° C. (the atmosphere was an ordinary living environment). The discharge capacity was represented by the value (mAh/g) per weight of the anode. FIG. 18 shows the initial discharge curve in Experiment Example 1.

As shown in FIG. 18, when the bicontinuous body was used as the cathode, the average discharge voltage was 0.8 V, and the discharge capacity was 410 mAh/g. Note that the average discharge voltage is the battery voltage obtained when the discharge capacity is ½ (in Experiment Example 1, 205 mAh/g) of the discharge capacity (in this experiment example, 410 mAh/g) of the battery.

Table 7 below shows the average discharge voltages of water batteries in which the bicontinuous bodies were manufactured from nanosheets made of carbon (C), iron oxide ($Fe_2O_3$), manganese oxide ($MnO_2$), zinc oxide (ZnO), molybdenum oxide ($MoO_3$), and molybdenum sulfide ($MoS_2$) and used as the cathodes.

TABLE 7

| Experiment Example 1 | |
|---|---|
| Nanosheet material | Average discharge voltage (V) |
| Carbon (C) | 0.80 |
| Iron oxide ($Fe_2O_3$) | 0.75 |
| Manganese oxide ($MnO_2$) | 0.85 |
| Zinc oxide (ZnO) | 0.73 |
| Molybdenum oxide ($MoO_3$) | 0.82 |
| Molybdenum sulfide ($MoS_2$) | 0.84 |

All average discharge voltages were 0.7 V or more, which were values larger than that of Comparative Example 1 (to be described later) in which a cathode using powdery carbon was evaluated. The nanosheets made of materials other than carbon also had large specific areas like graphene, so water reduction was efficiently performed, and this presumably improved the discharge voltage.

Experiment Example 2

Next, Experiment Example 2 of the third embodiment will be explained. Experiment Example 2 is an example in which a bicontinuous body given a three-dimensional network structure because a plurality of integrated nanofibers have branches is used as a cathode. The cathode was synthesized as follows. In the following explanation, a manufacturing method using carbon nanofibers will be described as a typical example. However, the bicontinuous body having the three-dimensional network structure can be adjusted by changing the carbon nanofibers to nanofibers made of another material.

The method of evaluation of the bicontinuous body, the manufacture of a water battery, and the method of a discharge test were performed in the same manner as in Experiment Example 1. The bicontinuous body was manufactured by the same process as disclosed in Experiment Example 1, and a carbon nanofiber sol [a dispersion medium: water ($H_2O$), 0.4 wt %, manufactured by Sigma-Aldrich] was used as a raw material.

The obtained bicontinuous body was evaluated by performing XRD measurement, SEM observation, porosity measurement, a tension test, and BET specific surface area measurement. It was confirmed by the XRD measurement that the bicontinuous body manufactured by the present invention was a carbon (C, PDF card No. 00-058-1638) single phase. It was also confirmed by the SEM observation and a mercury press-in method that the obtained bicontinuous body was a bicontinuous body in which the nanofibers continued and the average pore size was 1 µm. In addition, the BET specific surface area of the bicontinuous body was measured by the mercury press-in method and found to be 620 $m^2/g$. Also, the porosity of the bicontinuous body was measured by the mercury press-in method and found to be 93% or more. Furthermore, it was confirmed from the result of the tension test that even when a strain of 40% was applied by tensile stress, the bicontinuous body obtained in Experiment Example 2 did not exceed the elastic region and restored to the shape before the application of the stress.

Coin-cell water batteries similar to those of Experiment Example 1 were manufactured by using this carbon nanofiber bicontinuous body as a cathode. Tables 8 and 9 show the discharge voltages of the water batteries manufactured in Experiment Example 2. In Experiment Example 2, the initial discharge capacity was 430 mAh/g, which was a value larger than that when using the graphene bicontinuous body in Experiment Example 1. The characteristics thus improved probably because the use of the bicontinuous body having higher flexibility enabled a smooth reaction during discharge.

Table 8 shows the average discharge voltages of water batteries in which the bicontinuous bodies were manufactured from nanofibers made of carbon (C), iron oxide ($Fe_2O_3$), manganese oxide ($MnO_2$), zinc oxide (ZnO), molybdenum oxide ($MoO_3$), and molybdenum sulfide ($MoS_2$) and used as the cathodes.

TABLE 8

| Experiment Example 2 | |
|---|---|
| Nanofiber material | Average discharge voltage (V) |
| Carbon (C) | 0.85 |
| Iron oxide ($Fe_2O_3$) | 0.84 |
| Manganese oxide ($MnO_2$) | 0.90 |
| Zinc oxide (ZnO) | 0.82 |
| Molybdenum oxide ($MoO_3$) | 0.83 |
| Molybdenum sulfide ($MoS_2$) | 0.91 |

All average discharge voltages were 0.8 V or more, which were values larger as a whole than those of the bicontinuous bodies including the nanosheets in Experiment Example 1. Like carbon nanofibers, the flexible cathode efficiently performed water reduction, and this presumably improved the discharge capacity, in these nanofiber examples as well.

Experiment Example 3

Experiment Example 3 will be explained below. In Experiment Example 3, a cathode formed by causing a bicontinuous body made of carbon nanofibers to carry an oxide or metal as a catalyst will be explained. A case in which the bicontinuous body is caused to carry $MnO_2$ as a catalyst will be explained below as a typical example. However, it is possible to cause the bicontinuous body to carry an arbitrary oxide as a catalyst by changing Mn to an arbitrary metal. It is also possible to cause the bicontinuous body to carry an arbitrary metal as a catalyst by performing no neutralization step.

The method of evaluation of the bicontinuous body, the manufacture of a water battery, and the method of a charge/discharge test were performed in the same manner as in Experiment Examples 1 and 2. The bicontinuous body was manufactured following the same procedures as in Experiment Example 2. After that, commercially available manganese (II) chloride tetrahydrate ($MnCl_2.4H_2O$; manufactured by KANTO KAGAKU) was dissolved in distilled water, and the manufactured bicontinuous body was impregnated with the solution, thereby causing the bicontinuous body to carry manganese chloride. Then, neutralization was performed by gradually dropping ammonia water (28%) on the bicontinuous body carrying manganese chloride (or on manganese chloride carried by the bicontinuous body) until the pH became 7.0, thereby depositing manganese hydroxide. The deposit was repeatedly washed with distilled water five times so that no chlorine remained.

The obtained manganese hydroxide-carrying bicontinuous body was heated in an argon atmosphere at 500° C. for 6 hrs, thereby manufacturing a bicontinuous body carrying manganese oxide ($MnO_2$). The manufactured manganese oxide-carrying bicontinuous body was evaluated by performing XRD measurement and TEM observation. It was possible to observe a peak of manganese oxide ($MnO_2$, PDF file No. 00-011-079) by the XRD measurement. It was confirmed that the catalyst carried by the bicontinuous body was a manganese oxide single phase. Also, a state in which manganese oxide deposited in the form of particles having an average particle size of 100 nm on the surface of the bicontinuous body was observed by the TEM.

A coin-cell water battery similar to those in Experiment Examples 1 and 2 was manufactured by using this manganese oxide-carrying bicontinuous body as a cathode. The average discharge voltage of the manufactured water battery of Experiment Example 3 was 0.91 V. Table 9 below also shows the results when using other catalysts.

TABLE 9

| Experiment Example 3 | |
|---|---|
| Catalyst/bicontinuous body materials | Average discharge voltage (V) |
| $MnO_2$/C | 0.91 |
| $Fe_2O_3$/C | 0.87 |
| ZnO/C | 0.86 |
| $MoO_3$/C | 0.84 |
| $MoS_2$/C | 0.91 |
| Fe/C | 0.83 |
| Mn/C | 0.85 |
| Zn/C | 0.80 |
| Mo/C | 0.79 |

In Experiment Example 3, the average discharge voltage was 0.91 V, which was a value larger than that when using the bicontinuous body not carrying manganese oxide as a catalyst in Experiment Example 2. It was confirmed that the cathode of the water battery of this experiment example stably operated.

Experiment Example 4

Experiment Example 4 will be explained below. In Experiment Example 4, a case in which a bicontinuous body made of a gel in which nanofibers produced by bacteria are dispersed carries manganese oxide as a catalyst will be explained. In the following explanation, a case in which a bicontinuous body is manufactured from nanofibers made of iron oxide produced by iron bacteria will be described as a typical example. However, a bicontinuous body including nanofibers made of manganese oxide can be adjusted by changing iron bacteria to arbitrary bacteria.

The method of evaluation of the bicontinuous body, the manufacture of a water battery, and the method of a discharge test were performed in the same manner as in Experiment Examples 1 and 2.

First, *Leptothrix ochracea* as iron bacteria was placed together with iron pieces (purity: 99.9% or more, manufactured by KOJUNDO CHEMICAL LABORATORY) in a JOP liquid culture medium in a test tube, and cultured by a shaker at 20° C. for 14 days. The JOP liquid culture medium is a culture medium which contains, in 1 L of sterilized ground water, 0.076 g of disodium hydrogen phosphate dodecahydrate, 0.02 g of potassium dihydrogen phosphate dihydrate, 2.383 g of HEPES [4-(2-hydroxyethyl)-1-piperazineethanesulfonic acid: a substance for a buffer solution], and 0.01 mmol/L of iron sulfate, and in which the pH is adjusted to 7.0 with an aqueous sodium hydroxide solution. Also, *Leptothrix ochracea* was purchased from ATCC (American Type Culture Collection).

After the culture, the iron pieces were removed, and the obtained gel was washed in pure water for 24 hrs by using a shaker. In this washing, pure water was changed three times. The washed gel was used as a raw material, and a water battery was manufactured by the same processes as disclosed in Experiment Examples 1 and 3.

The obtained bicontinuous body was evaluated by performing XRD measurement, SEM observation, porosity measurement, a tension test, and BET specific surface area measurement. It was confirmed by the XRD measurement that the bicontinuous body manufactured by the present invention was made of amorphous $Fe_3O_4$ and $\gamma$-$Fe_2O_3$ ($Fe_3O_4$, PDF card No. 01-075-1372, and $\gamma$-$Fe_2O_3$, PDF card No. 00-039-1346).

Also, it was confirmed by the SEM observation that hollow nanofibers (nanotubes) having a diameter of 1 μm continued in the bicontinuous body. In addition, the BET specific surface area was measured by a mercury press-in method and found to be 800 $m^2$/g. When the porosity of the bicontinuous body was measured by the mercury press-in method, the porosity was 95% or more. Furthermore, it was confirmed by the result of the tension test that even when a strain of 60% was applied by tensile stress, the bicontinuous body did not exceed the elastic region, and restored to the shape before the application of the stress.

In Experiment Example 4, the average discharge voltage of a water battery using the bicontinuous body made of the iron bacteria-produced iron oxide nanofibers as a cathode was 1.00 V. Table 10 below also shows the results obtained when using another bicontinuous body.

TABLE 10

Experiment Example 4

| Catalyst/bicontinuous body materials | Average discharge voltage (V) |
|---|---|
| $MnO_2$/bacteria-produced iron oxide | 1.00 |
| $MnO_2$/bacteria-produced $MnO_2$ | 1.10 |

In Experiment Example 4, the average discharge voltage was 1.00 V, which was a value larger than that when using the carbon nanofiber bicontinuous body carrying manganese oxide as in Experiment Example 3. This result was obtained perhaps because the use of the bicontinuous body having higher flexibility enabled a smooth reaction during discharge.

Also, as shown in Table 10, the average discharge voltage of a water battery including a cathode using the bicontinuous body made of bacteria-produced manganese oxide and containing manganese oxide as a catalyst was 1.10 V, which was a value larger than that in Experiment Example 3. The bacteria-produced manganese oxide was produced by culturing *Leptothrix discophora* as manganese bacteria in the same manner as described above by using manganese pieces (purity: 99.9% or more, manufactured by KOJUNDO CHEMICAL LABORATORY). *Leptothrix discophora* was purchased from ATCC. Like iron bacteria-produced iron oxide, the discharge voltage presumably improved because the bacteria-produced cathode having high flexibility efficiently performed water reduction, when using the bacteria-produced nanofibers as well.

Experiment Example 5

Experiment Example 5 will be explained below. In Experiment Example 5, for a case in which a bicontinuous body made of a gel in which bacteria-produced cellulose was dispersed further carried manganese oxide as a catalyst, the method of evaluation of the bicontinuous body, the method of manufacture of a water battery, and the method of a charge/discharge test were performed in the same manner as in Experiment Examples 1 and 2.

First, nata de coco (manufactured by Fujicco) was used as a bacterial cellulose gel produced by *Acetobacter xylinum* as acetic acid bacteria, and a water battery was manufactured by the same processes as disclosed in Experiment Examples 1 and 3. Note that in Experiment Example 5, a bicontinuous body dried in a vacuum was carbonized by being burned in a nitrogen atmosphere at 1,200° C. for 2 hrs, thereby manufacturing a cathode.

The obtained bicontinuous body (a carbonized bicontinuous body) was evaluated by performing XRD measurement, SEM observation, porosity measurement, a tension test, and BET specific surface area measurement. It was confirmed by the XRD measurement that this bicontinuous body was a carbon (C, PDF card No. 01-071-4630) single phase. Also, it was confirmed by the SEM observation that nanofibers having a diameter of 20 nm continued in the bicontinuous body. In addition, the BET specific surface area of the bicontinuous body was measured by a mercury press-in method and found to be 830 $m^2$/g. The porosity of the bicontinuous body measured by the mercury press-in method was 99% or more. Furthermore, it was confirmed by the result of the tension test that even when a strain of 80% was applied by tensile stress, the bicontinuous body did not exceed the elastic region and restored to the shape before the application of the stress, i.e., the bicontinuous body had high flexibility even after carbonization.

Table 11 below shows the average discharge voltage of the water battery in Experiment Example 5. Table 11 also shows the results of Experiment Examples 1, 2, 3, and 4. In Experiment Example 5, the average discharge voltage was 1.21 V, which was a value larger than that when using a bicontinuous body carrying manganese oxide and containing iron bacteria-produced iron oxide as in Experiment Example 4.

The characteristics improved as described above probably because the use of the bicontinuous body having higher flexibility efficiently performed water reduction during discharge, and C having high conductivity enabled a smooth reaction.

In the present invention as described above, a bicontinuous body having high porosity and high flexibility found by BET specific surface area measurement is obtained, and a water battery using this bicontinuous body as a cathode implements efficient water reduction during discharge. The characteristics improve as described above perhaps because the present invention improves various factors.

Experiment Example 6

Experiment Example 6 will be explained below. In Experiment Example 6, the water battery which is naturally degradable together with the housing explained with reference to FIG. 17 was manufactured for a case in which a bicontinuous body made of a gel in which bacteria-produced cellulose was dispersed further carried manganese oxide as a catalyst. The method of synthesis of the bicontinuous body carrying manganese oxide as a catalyst, the method of evaluation of the bicontinuous body, and the method of a charge/discharge test were performed in the same manner as in Experiment Example 5.

The method of manufacturing the water battery according to Experiment Example 6 will be explained below. An anode was manufactured by cutting a commercially available metal magnesium plate (thickness: 200 μm, manufactured by Nilaco) into a 20 mm×20 mm square by using scissors.

As an electrolytic solution, a solution prepared by dissolving potassium chloride (KCl, manufactured by KANTO KAGAKU) at a concentration of 1 mol/L in pure water was used. As a separator, a cellulose-based separator (manufactured by NIPPON KODOSHI) for batteries was cut into a 25 mm×25 mm square.

The periphery of the anode made of the metal magnesium plate was fixed to a copper foil (manufactured by Nilaco) as an anode current collector by spot-welding. Furthermore, this copper foil was cut into 25 mm×25 mm in a planar view, and the end of the cut foil was spot-welded to the short side of a copper foil (manufactured by Nilaco) cut into 3×20 mm as a terminal.

Also, the cathode was bonded by pressure to a copper foil (manufactured by Nilaco) cut into 25 mm×25 mm as a cathode current collector, and the end of this copper foil was spot-welded to the short side of a copper foil (manufactured by Nilaco) cut into 3×20 mm as a terminal.

A plant-based film sheet ECOLOJU (manufactured by Mitsubishi Plastics) was used as the material of the housing. Two cut sheets were formed by cutting this sheet into 30 mm×30 mm in a planar view, one cut sheet was used as a first housing, and the other cut sheet was used as a second housing. Also, a 2 mm×2 mm opening was formed as a gas release hole in the central portion of the second housing to be used on the cathode side.

The anode current collector to which the anode was fixed and the separator were arranged on the first housing on the anode side, and the electrolytic solution was injected into the separator. The first housing was covered with the cathode current collector on which the cathode was bonded by pressure and with the second housing, and the inner peripheries (width: about 5 mm) of the first and second housings were airtightly adhered by a biodegradable resin (manufactured by MIYOSHI OIL & FAT), thereby manufacturing the water battery.

Table 11 shows the average discharge voltage of the water battery in Experiment Example 6. In Experiment Example 6 as shown in Table 11, the average discharge voltage was 1.20 V, which was almost the same discharge voltage as that in Experiment Example 5.

The water battery in Experiment Example 6 was installed in soil after being discharged. Consequently, it was possible to visually confirm the decomposition of the housing in about half a month, and the battery completely disappeared in about a month. This shows that microorganisms in soil decomposed the battery by metabolism.

Experiment Example 7

Experiment Example 7 will be explained below. In Experiment Example 7, a discharge test was conducted on a water battery manufactured following the same procedures as in Experiment Example 6, under an environment imitating soil.

Table 11 shows the average discharge voltage of the water battery in Experiment Example 7. In Experiment Example 7 as shown in Table 11, the average discharge voltage was 1.16 V, which was lower than that in Experiment Example 6, but this value demonstrates that the battery operated with no problem even under the soil environment. Also, when the water battery in Experiment Example 7 was left to stand in soil after being discharged, the battery completely disappeared in about a month from the start of the discharge test.

Comparative Example 1

Next, Comparative Example 1 will be explained. In Comparative Example 1, a water battery cell using carbon (Ketjen black EC600JD) well known as an air electrode of a general air battery and manganese oxide was manufactured and evaluated. In Comparative Example 1, a coin-cell water battery similar to that in Experiment Example 1 was manufactured.

Manganese oxide powder (manufactured by KANTO KAGAKU), Ketjen black powder (manufactured by LION), and polytetrafluoroethylene (PTFE) powder (manufactured by DAIKIN) were sufficiently pulverized and mixed at a weight ratio of 50:30:20 by using a mortar machine, and roll forming was performed on the obtained mixture, thereby manufacturing a sheet-like electrode (thickness: 0.5 mm). A cathode was obtained by cutting this sheet-like electrode into a circular shape having a diameter of 14 mm. The conditions of a battery discharge test were the same as in Experiment Example 1.

Table 11 shows the average discharge voltage of the water battery according to Comparative Example 1, together with the results of Experiment Examples 1 to 7. As shown in Table 11, the average discharge voltage of Comparative Example 1 was 0.50 V, which was a value smaller than that in Experiment Example 1. Also, the cathode of Comparative Example 1 was observed after the measurements. Consequently, the cathode partially broke and dispersed in the electrolytic solution, and it was found that the electrode structure of the cathode was destroyed.

TABLE 11

| Experiment Example | Average discharge voltage (V) | Discharge capacity (mAh/g) |
|---|---|---|
| Experiment Example 1 (graphene) | 0.80 | 410 |
| Experiment Example 2 (carbon nanofiber) | 0.85 | 430 |
| Experiment Example 3 ($MnO_2$/carbon nanofiber) | 0.91 | 490 |
| Experiment Example 4 ($MnO_2$/bacteria-produced iron oxide) | 1.00 | 500 |
| Experiment Example 5 ($MnO_2$/carbonized bacterial cellulose) | 1.21 | 505 |
| Experiment Example 6 ($MnO_2$/carbonized bacterial cellulose) | 1.20 | 500 |
| Experiment Example 7 ($MnO_2$/carbonized bacterial cellulose) | 1.16 | 490 |
| Experiment Example 1 (Ketjen black) | 0.50 | 250 |

Table 12 below shows similar results of Experiment Examples 1 to 7 and Comparative Example 1 of the third embodiment when manufacturing the anodes from Fe, zinc, and Al.

TABLE 12

| Experiment Example | Anode | Cathode | Average discharge voltage | Discharge capacity |
|---|---|---|---|---|
| Experiment Example 1 | Fe | Graphene | 0.39 | 210 |
| Experiment Example 2 | Fe | Carbon nanofiber | 0.44 | 190 |
| Experiment Example 3 | Fe | $MnO_2$/carbon nanofiber | 0.50 | 260 |
| Experiment Example 4 | Fe | $MnO_2$/bacteria-produced iron oxide | 0.55 | 260 |
| Experiment Example 5 | Fe | $MnO_2$/carbonized bacterial cellulose | 0.57 | 260 |
| Experiment Example 6 | Fe | $MnO_2$/carbonized bacterial cellulose | 0.61 | 250 |
| Experiment Example 7 | Fe | $MnO_2$/carbonized bacterial cellulose | 0.56 | 230 |
| Comparative Example 1 | Fe | Ketjen black | 0.23 | 140 |
| Experiment Example 1 | Zn | Graphene | 0.53 | 370 |
| Experiment Example 2 | Zn | Carbon nanofiber | 0.59 | 360 |
| Experiment Example 3 | Zn | $MnO_2$/carbon nanofiber | 0.64 | 430 |
| Experiment Example 4 | Zn | $MnO_2$/bacteria-produced iron oxide | 0.68 | 440 |
| Experiment Example 5 | Zn | $MnO_2$/carbonized bacterial cellulose | 0.77 | 460 |
| Experiment Example 6 | Zn | $MnO_2$/carbonized bacterial cellulose | 0.79 | 450 |
| Experiment Example 7 | Zn | $MnO_2$/carbonized bacterial cellulose | 0.70 | 410 |
| Comparative Example 1 | Zn | Ketjen black | 0.29 | 220 |
| Experiment Example 1 | Al | Graphene | 0.61 | 530 |
| Experiment Example 2 | Al | Carbon nanofiber | 0.68 | 530 |
| Experiment Example 3 | Al | $MnO_2$/carbon nanofiber | 0.73 | 590 |
| Experiment Example 4 | Al | $MnO_2$/bacteria-produced iron oxide | 0.76 | 630 |
| Experiment Example 5 | Al | $MnO_2$/carbonized bacterial cellulose | 0.88 | 650 |
| Experiment Example 6 | Al | $MnO_2$/carbonized bacterial cellulose | 0.91 | 650 |
| Experiment Example 7 | Al | $MnO_2$/carbonized bacterial cellulose | 0.84 | 600 |
| Comparative Example 1 | Al | Ketjen black | 0.42 | 300 |

It was confirmed by the above results that the batteries (water batteries) of the third embodiment were superior in voltage and capacity to a water battery using a cathode made of a well-known material.

In the third embodiment as explained above, the cathode is made of the bicontinuous body given the three-dimensional network structure because the plurality of integrated nanostructures have branches, and this facilitates handling the battery (water battery) using magnesium as the anode. The battery of the present invention does not contain any metal elements except elements used in fertilizers for soil and metals contained in rainwater and seawater, and is naturally degradable. This extremely decreases the environmental load. A battery like this is effectively usable as a disposable battery in a daily environment, and as various driving sources for, e.g., sensors to be used in soil. In addition, the present invention can increase the discharge voltage of a water battery.

Note that the present invention is not limited to the embodiments explained above, and it is obvious that a person having an ordinary skill in the art can make many modifications and combinations without departing from the spirit and scope of the invention.

EXPLANATION OF THE REFERENCE NUMERALS AND SIGNS

101 . . . cathode, 102 . . . anode, 103 . . . electrolyte

The invention claimed is:

1. A battery comprising:
a cathode made of a bicontinuous body having a three-dimensional network structure in which a plurality of nanostructures are integrated by noncovalent bonds and having a flexible structure in which bonded portions of the nanostructures are deformable;
an anode;
an electrolyte made of a salt and sandwiched between the cathode; and
a catalyst attached on a surface of the cathode and configured to promote discharge on the surface of the cathode,
wherein the catalyst is made of a hydrate of an oxide of at least one metal selected from calcium, iron, zinc, copper, and molybdenum;
each of the plurality of nanostructures is a nanofiber constituted by bacteria cellulose, and the bicontinuous body is carbonized and has a distortion of 50% or more at elastic limit.

2. The battery according to claim 1, wherein the electrolyte is made of an aqueous solution of one of potassium chloride, sodium chloride, and a mixture of potassium chloride and sodium chloride.

3. The battery according to claim 1, further comprising a housing configured to accommodate a cell including the cathode, the electrolyte, and the anode, wherein the housing is made of a naturally degradable material.

4. The battery according to claim 1, wherein the anode contains one of magnesium, zinc, iron, and aluminum.

5. The battery according to claim 1, wherein the cathode is an air electrode.

6. The battery according to claim 1, wherein an active material in the cathode is water.

7. The battery according to claim 1, wherein the cathode is an air electrode.

8. The battery according to claim 1, wherein the cathode is an air electrode.

9. The battery according to claim 2, wherein the cathode is an air electrode.

10. The battery according to claim 3, wherein the cathode is an air electrode.

11. The battery according to claim 4, wherein the cathode is an air electrode.

12. The battery according to claim 1, wherein an active material in the cathode is water.

* * * * *